(12) United States Patent
Murphy

(10) Patent No.: US 12,266,259 B2
(45) Date of Patent: *Apr. 1, 2025

(54) VISUAL FEEDBACK SYSTEM

(71) Applicant: Timothy T. Murphy, Zeeland, MI (US)

(72) Inventor: Timothy T. Murphy, Zeeland, MI (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/320,663

(22) Filed: May 19, 2023

(65) Prior Publication Data

US 2023/0316880 A1    Oct. 5, 2023

Related U.S. Application Data

(63) Continuation of application No. 17/552,798, filed on Dec. 16, 2021, now Pat. No. 11,694,526, which is a continuation of application No. 16/807,805, filed on Mar. 3, 2020, now Pat. No. 11,210,911.

(60) Provisional application No. 62/813,361, filed on Mar. 4, 2019.

(51) Int. Cl.
| | |
|---|---|
| *G08B 5/38* | (2006.01) |
| *A63F 13/5375* | (2014.01) |
| *G06F 3/16* | (2006.01) |
| *G09B 21/00* | (2006.01) |
| *H05B 47/105* | (2020.01) |
| *H05B 47/155* | (2020.01) |

(52) U.S. Cl.
CPC ............ *G08B 5/38* (2013.01); *A63F 13/5375* (2014.09); *G06F 3/165* (2013.01); *G06F 3/167* (2013.01); *G09B 21/009* (2013.01); *H05B 47/105* (2020.01); *H05B 47/155* (2020.01)

(58) Field of Classification Search
None
See application file for complete search history.

(56) References Cited

U.S. PATENT DOCUMENTS

| | | | |
|---|---|---|---|
| 6,173,059 B1 | 1/2001 | Huang et al. | |
| 8,957,594 B2 | 2/2015 | Kim | |
| 9,304,736 B1 | 4/2016 | Whiteley et al. | |
| 9,807,852 B1 * | 10/2017 | Starner | ............... H04R 1/1041 |
| 10,283,114 B2 | 5/2019 | Brooks et al. | |
| 10,791,607 B1 | 9/2020 | Modestine et al. | |
| 11,694,526 B2 * | 7/2023 | Murphy | ............... H05B 47/105 |
| | | | 340/501 |
| 2010/0185308 A1 | 7/2010 | Yoshida et al. | |
| 2011/0291954 A1 | 12/2011 | Djavaherian | |
| 2015/0199172 A1 | 7/2015 | Ringuette et al. | |
| 2016/0165336 A1 | 6/2016 | Di Censo et al. | |

(Continued)

FOREIGN PATENT DOCUMENTS

EP    3024220 A2 *    5/2016    ........... G06F 3/1431

OTHER PUBLICATIONS https://www.youtube.com/watch?v=vhDf-7dar0c—Video titled "RGB Lighting on a Monitor—It's NOT Stupid !! "—posted Jan. 11, 2018 by Linus Tech Tips, relevant segment from :53 to 2:09, key talking point 1:41.

*Primary Examiner* — K. Wong
(74) *Attorney, Agent, or Firm* — McGarry Bair PC

(57) ABSTRACT

A visual feedback system can include a display panel, an interface unit, and at least one visual feedback device. The at least one visual feedback device can be configured to provide cues for audio generated within a virtual environment.

20 Claims, 22 Drawing Sheets

(56) References Cited

U.S. PATENT DOCUMENTS

| | | |
|---|---|---|
| 2016/0379485 A1 | 12/2016 | Anastassov et al. |
| 2018/0173544 A1 | 6/2018 | Hyodo et al. |
| 2018/0181810 A1 | 6/2018 | Jhawar et al. |
| 2018/0199138 A1 | 7/2018 | Dusan et al. |
| 2018/0237033 A1 | 8/2018 | Hakeem et al. |
| 2018/0262849 A1 | 9/2018 | Farmani et al. |
| 2018/0302738 A1 | 10/2018 | Di Censo et al. |
| 2018/0323763 A1 | 11/2018 | Bailey et al. |
| 2018/0336543 A1 | 11/2018 | van Os et al. |
| 2020/0137509 A1 | 4/2020 | Stanek et al. |
| 2020/0196932 A1 | 6/2020 | Johnson et al. |
| 2020/0342869 A1 | 10/2020 | Lee et al. |

* cited by examiner

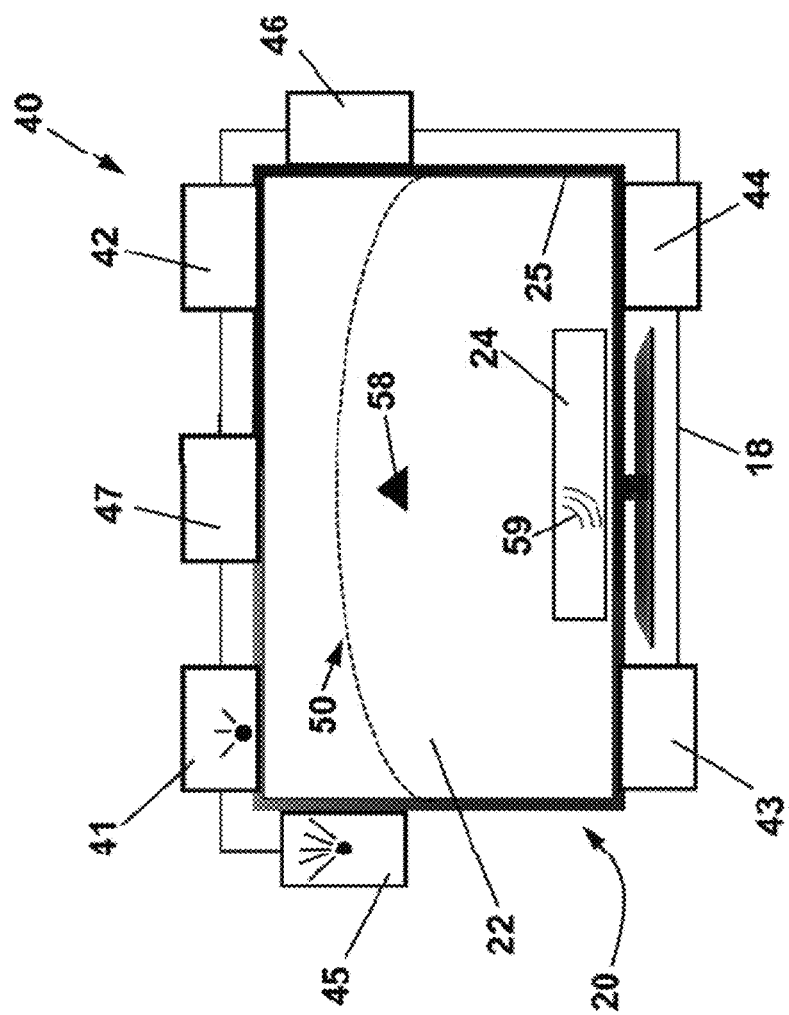
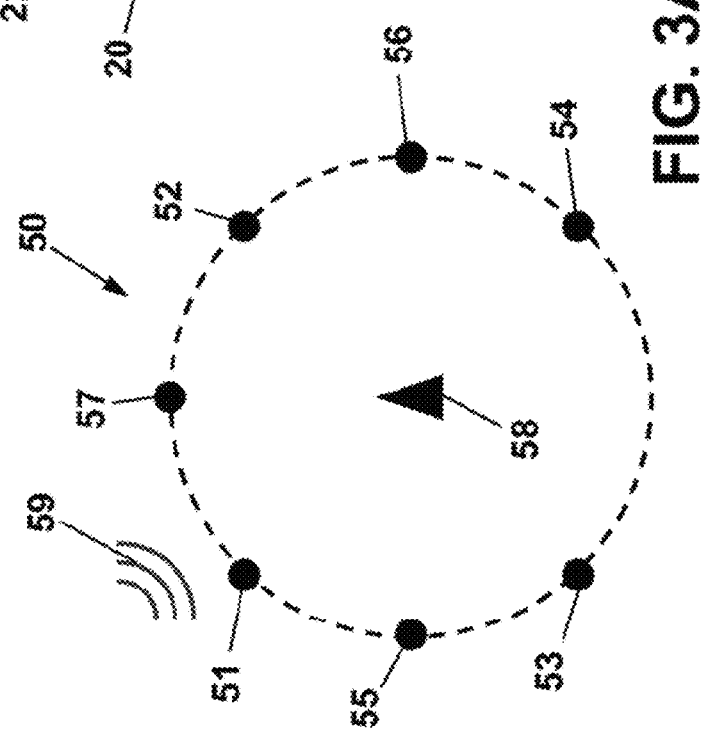
FIG. 3B
FIG. 3A

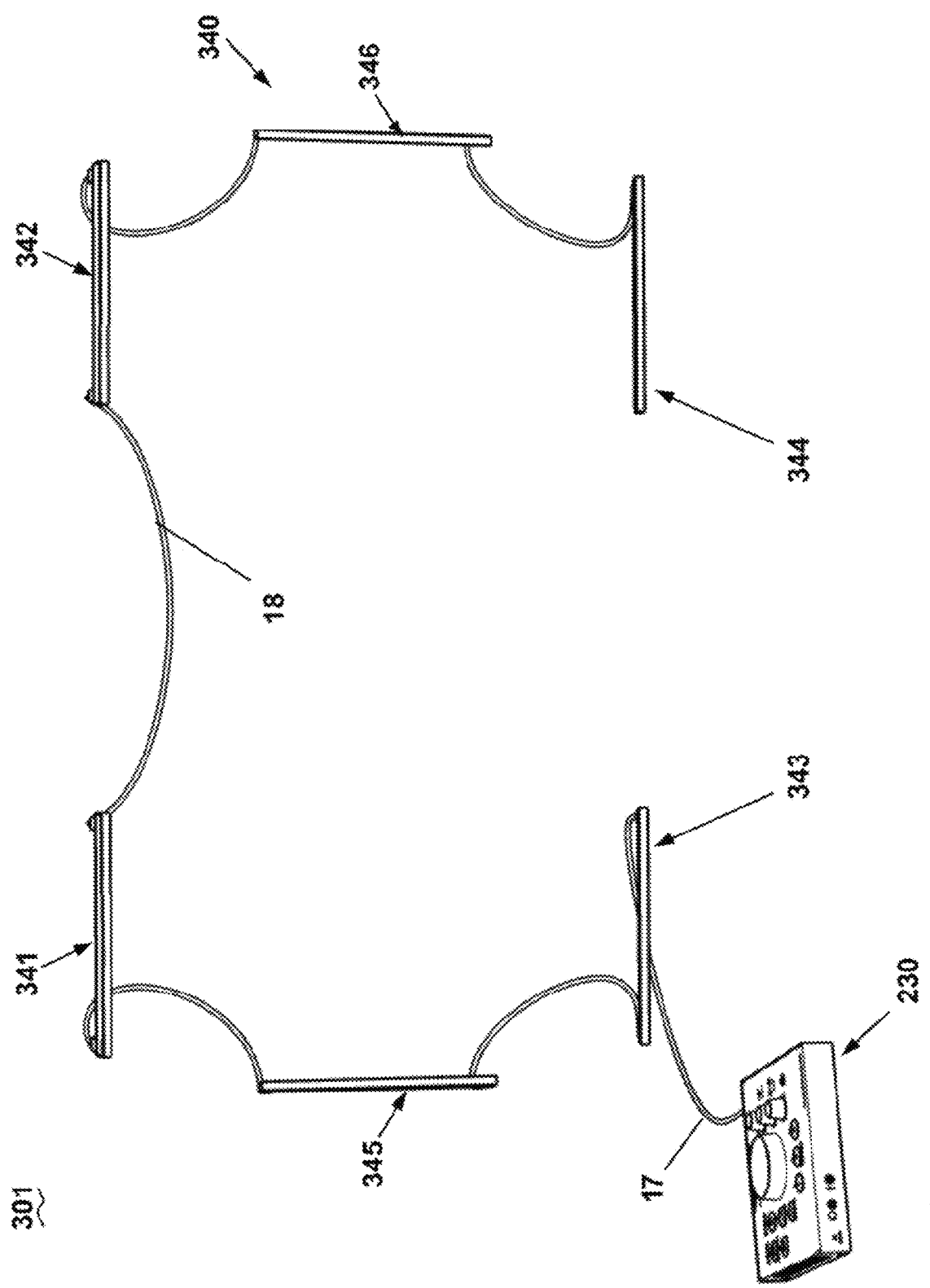

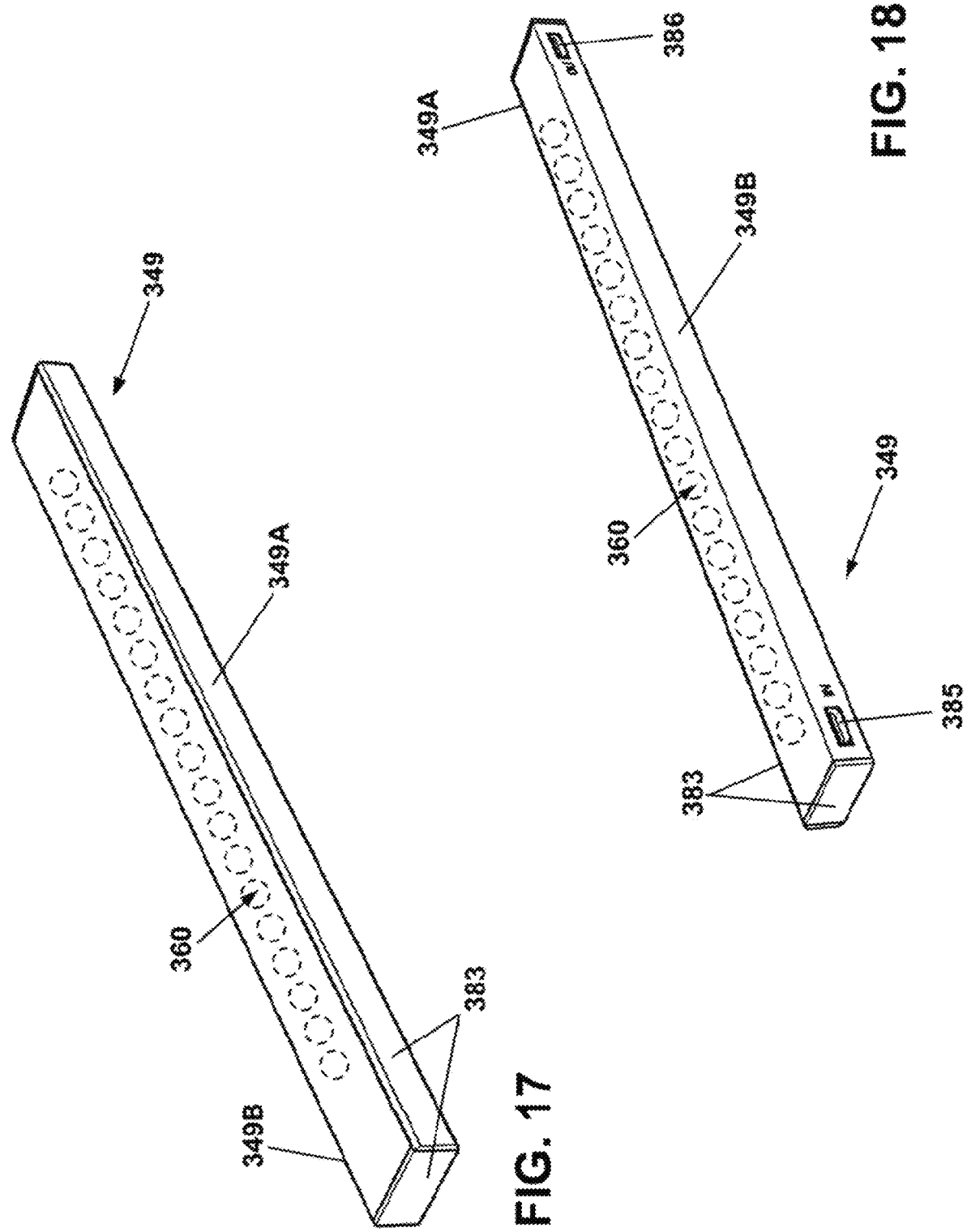

VISUAL FEEDBACK SYSTEM

CROSS REFERENCE TO RELATED APPLICATION

This application is a continuation application of U.S. patent application Ser. No. 17/552,798, filed on Dec. 16, 2021, now issued as U.S. Pat. No. 11,694,526, which is a continuation application of U.S. patent application Ser. No. 16/807,805, filed on Mar. 3, 2020, now issued as U.S. Pat. No. 11,210,911, which claims the benefit of U.S. Provisional Patent Application No. 62/813,361, filed Mar. 4, 2019, all of which are incorporated herein by reference in their entirety.

BACKGROUND

Virtual, interactive environments can include an avatar within, and interacting with, components in the environment. For example, in a gaming environment, a user may interact with other users, non-playable characters, or other elements in the environment for completion of a puzzle, task, quest, raid, or the like. Such interactions are generally represented by audio signals output to a sound device, e.g. speakers or headphones, as well as video signals output to a display.

BRIEF DESCRIPTION

In one aspect, the disclosure relates to a visual feedback system. The visual feedback system has an interface unit comprising at least one input configured to receive an audio signal and a processor configured to receive the audio signal and to provide an output signal indicative of at least one property of the audio signal, at least one visual feedback device electrically coupled to the interface unit and having a set of light sources configured to illuminate based on one of a directional property of the audio signal, and at least one controller selectively controllable by a user, the at least one controller adjusts a sensitivity of the visual feedback device to the audio signal.

In another aspect, the disclosure relates to a visual feedback system. The visual feedback system includes an interface unit comprising at least one input configured to receive an audio signal and a processor configured to receive the audio signal and to provide an output signal indicative of at least one property of the audio signal, at least one visual feedback device electrically coupled to the interface unit and having a set of light sources configured to illuminate based on one of a type of sound, a quality of sound, and a loudness of sound of the audio signal; and at least one controller selectively controllable by a user, the at least one controller adjusts a sensitivity of the visual feedback device to the audio signal.

BRIEF DESCRIPTION OF THE DRAWINGS

In the drawings:

FIG. 3A is a schematic view of a location map that can be utilized in the visual feedback system of FIG. 1 during operation of the interactive console.

FIG. 3B is a schematic view of the visual feedback device of FIG. 1 utilizing the location map of FIG. 3A.

FIG. 16 is a schematic front view of the interface unit and set of visual feedback devices of FIG. 15 isolated from the display assembly.

FIG. 17 is a perspective view of a casing that can be utilized in the visual feedback system of FIG. 15 illustrating a first side.

FIG. 18 is a perspective view of the casing of FIG. 17 illustrating a second side.

DETAILED DESCRIPTION

Figure 1:
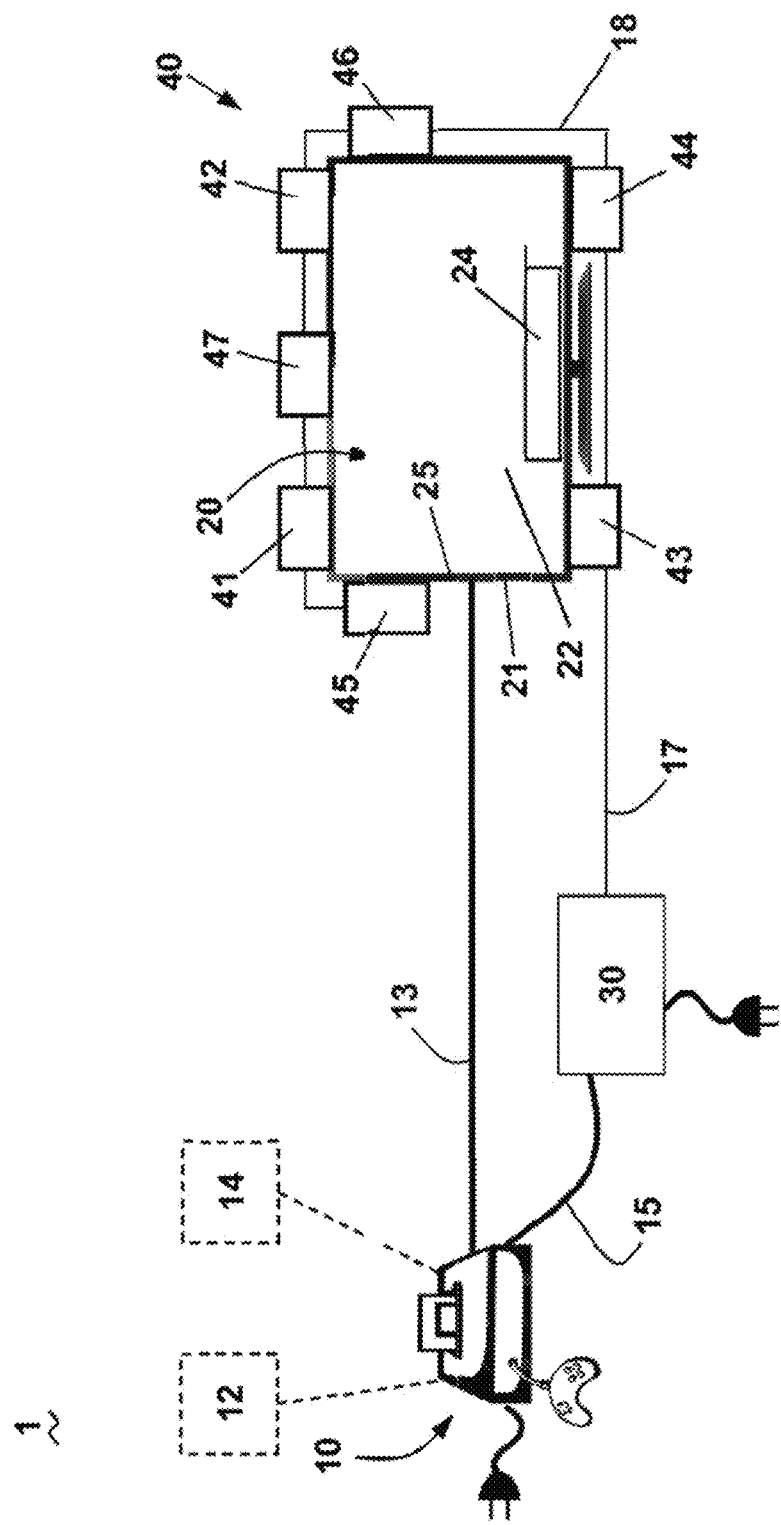
FIG. 1 is a schematic view of an exemplary visual feedback system including an interactive console, an interface unit, and a visual feedback device in accordance with various aspects described herein.

Aspects of the disclosure relate to system that provides visual feedback to a user based on audio signals, including those that might be present in a virtual environment such as a video game. An interface unit receives one or more audio inputs from an interactive console, such as a game console during game play. The interface unit detects sounds from the audio inputs, determines characteristics of the detected sounds, and outputs one or more signals to visual output or feedback devices that generate a visual representation of the detected sounds based on the determined characteristics. The determined characteristics of the sounds can include amplitude or loudness of a sound, frequency of a sound, or relative location of a sound. The visual output devices represent by their positioning, the relative location of the sound, and by their output the frequency and amplitude of the sound.

Aspects of the disclosure will be described in an exemplary environment of a first-person shooter (FPS) game. The system can provide gamers visual feedback that is indicative of a position of events happening within the game based on the amplitude of the audio on at least one channel. In one example, deaf or hard-of-hearing persons can utilize the system for gaming.

The table below represents an exemplary distribution of a gaming market. This data is a best estimate based on multiple different sources. Total there are about 1.8 billion gamers worldwide. About 66% of gamers use a PC with the remaining 44% using a gaming console. The accessory can be compatible with each of the platforms listed below.

| Platform | Percentage of Total Gamers | Number of Gamers |
| --- | --- | --- |
| PC | 66% | 1.2 billion |
| Playstation | 30% | 540 million |
| Xbox | 14% | 252 million |

As used herein, "a set" can include any number of the respectively described elements, including only one element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

As used herein, a "controller" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

FIG. 1 illustrates an exemplary visual feedback system 1 according to various aspects described herein. In the illustrated example, the visual feedback system 1 can include an interactive console 10, a display assembly 20, an interface unit 30, and a set of visual feedback devices 40. It should be recognized that the interactive console 10, display assembly 20 and interface unit 30 including at least one visual feedback device 40 can be sold as a combination or as individual components. Aspects of the disclosure will be described in one exemplary environment of a gaming system, wherein the interactive console 10 is in the form of a gaming console. It will be understood that the interactive console 10 can have any suitable though this need not be the case. In an exemplary embodiment, the interface unit 30 including at least one visual feedback device 40 can be sold as a kit for retrofit use with any combination of pre-existing interactive consoles and display assemblies.

The interactive console 10 can include a typical game console system such as Microsoft Xbox, a Sony Playstation, a Nintendo Wii, or the like. The interactive console 10 could also be a Windows computing device, a Unix computing device, a Linux computing device, an Apple OSX computing device, or a mobile computing device such as an Apple iOS device or an Android device, in non-limiting examples. The interactive console 10 can include known logic, circuitry, interfaces or code that is operable to present a game to, or enable game play interaction between, one or more local or remote players. In one example, the interactive console 10 can present a first-person-shooter game to one or more players.

The interactive console 10 can include at least a video controller 12 for generating and outputting video graphics and an audio controller 14 for generating and outputting audio to the display 20. The video and audio controllers 12, 14 can also include or be associated with any suitable number of individual microprocessors, power supplies, storage devices, interface cards, and other standard components. While illustrated schematically outside the interactive console 10, it will be understood that the video and audio controllers 12, 14 can be located within the interactive console 10, such as within the housing of the console.

The video controller 12 can also include suitable logic, circuitry, interfaces and/or code that can be operable to communicate video in accordance with one or more wired or wireless video transmission standards. The video controller 12 can be operable to generate and output video data from the video controller 12 to the display assembly 20 via a link 13. In a non-limiting example, the video data can be in accordance with a High-Definition Multimedia Interface (HDMI) standard, and the link 13 can include an HDMI cable. The link 13 can also be in the form of any suitable wired or wireless connection between the video controller 12 and the display assembly 20.

The audio controller 14 can also include suitable logic, circuitry, interfaces and/or code that may be operable to process audio functions such as volume or gain control, compression, decompression, encoding, decoding, surround-sound processing, and the like to output single-channel or multi-channel audio signals. The audio controller 14 can generate and send an audio output or audio signal to the display assembly 20 or to the interface unit 30 via a link 15. In non-limiting examples, the audio signal can be in the form of a digital audio signal such as Sony/Philips Digital Interface (S/PDIF), or an analog audio signal such as via a line out jack. The link 15 can be in the form of an analog or digital audio cable, or any suitable wired or wireless connection between the audio controller 14 and the display assembly 20 or interface unit 30.

The display assembly 20 can further include a housing 21 with a display panel 22 and an audio device 24. The display panel 22 can be in the form of any type of display, including a liquid crystal display (LCD), light-emitting diode (LED) display, a plasma display, or a touchscreen display. The display assembly 20 can be implemented in any suitable form, including a computer monitor, a smartphone display, or a television display. In the example shown, the display assembly 20 is in the form of a computer monitor having a size of, in one example, at least 80 cm (or 32 inches). In addition, the audio device 24 can be in the form of speakers integrated with the housing 21 of the display assembly 20. The interactive console 10 can be configured to send video signals to the display panel 20 via the link 13. The interactive console 10 can also be configured to send audio signals to the audio device 24 via the link 13, or to the interface unit 30 via the link 15.

The interface unit 30 can include suitable logic, circuitry, interfaces, or code that can be operable to convert the audio signals generated by the interactive console 10 into an output that can be visually represented by the set of visual feedback devices 40.

The set of visual feedback devices 40 can be coupled to, or arranged about, at least a portion of a perimeter 25 of the display assembly 20. The set of visual feedback devices 40 can be coupled to the display assembly 20 in any suitable manner including, but not limited to, a fastener, a hinge assembly, an adhesive, or the like. Additionally, or alternatively, the set of visual feedback devices 40 can be integrated within the display assembly 20. In the example shown, the set of visual feedback devices 40 includes a front-left device 41, a front-right device 42, a rear-left device 43, a rear-right device 44, a side-left device 45, a side-right device 46, and a center device 47. Lines 18 represent an electrical or signal coupling between devices in the set of visual feedback devices 40. It will be understood that the lines 18 can represent a wired or wireless connection for supplying power, data, control signals, or the like between devices in the set of visual feedback devices 40.

The devices 41, 42, 43, 44, 45, 46, 47 can be configured to represent at least one property of the audio signal. In a non-limiting example where the interactive console 10 is in the form of a gaming console, the set of visual feedback devices 40 can be configured to illuminate based on a directional property of the audio signal, such as the location of where an in-game sound is coming from during operation of the gaming console. Additionally, or alternatively, the set of visual feedback devices 40 can be configured to illuminate to indicate a second property of the audio signal. The second property can include, in non-limiting examples, indication of a type of sound (e.g. footsteps, ambient noise, wind blowing, talking, door slamming, or the like), a quality of sound (e.g. constant, sharp, general noise, or the like), a loudness of sound, or a combination thereof.

In one example, the set of visual feedback devices 40 can include hardware boxes physically attached or mounted about at least a portion of the perimeter 25 of the display assembly 20. The set of visual feedback devices 40 can also have light-emitting hardware, such as light-emitting diodes (LEDs) to graphically represent the amplitude or frequency of sound in the audio signal from the interactive console 10 received by the interface unit 30. A link 17, such as a four-conductor interconnect cable, can couple the interface unit 30 to the set of visual feedback devices 40 to deliver signal output to the devices 40. The link 17 can also be in the form of any suitable wired or wireless connection between the interface unit 30 and the set of visual feedback devices 40. Furthermore, lines 18 are electrically coupling devices within the set of visual feedback devices 40. The lines 18 can represent a data connection, power connection, control signal connection, or the like, or combinations thereof. It is also contemplated that the lines 18 can represent a wired or wireless connection within or interconnecting the set of visual feedback devices 40. In addition, while the set of visual feedback devices 40 are illustrated as being connected in series to the interface unit 30, it is also contemplated that a parallel connection to the interface unit 30 can be utilized.

Figure 2:
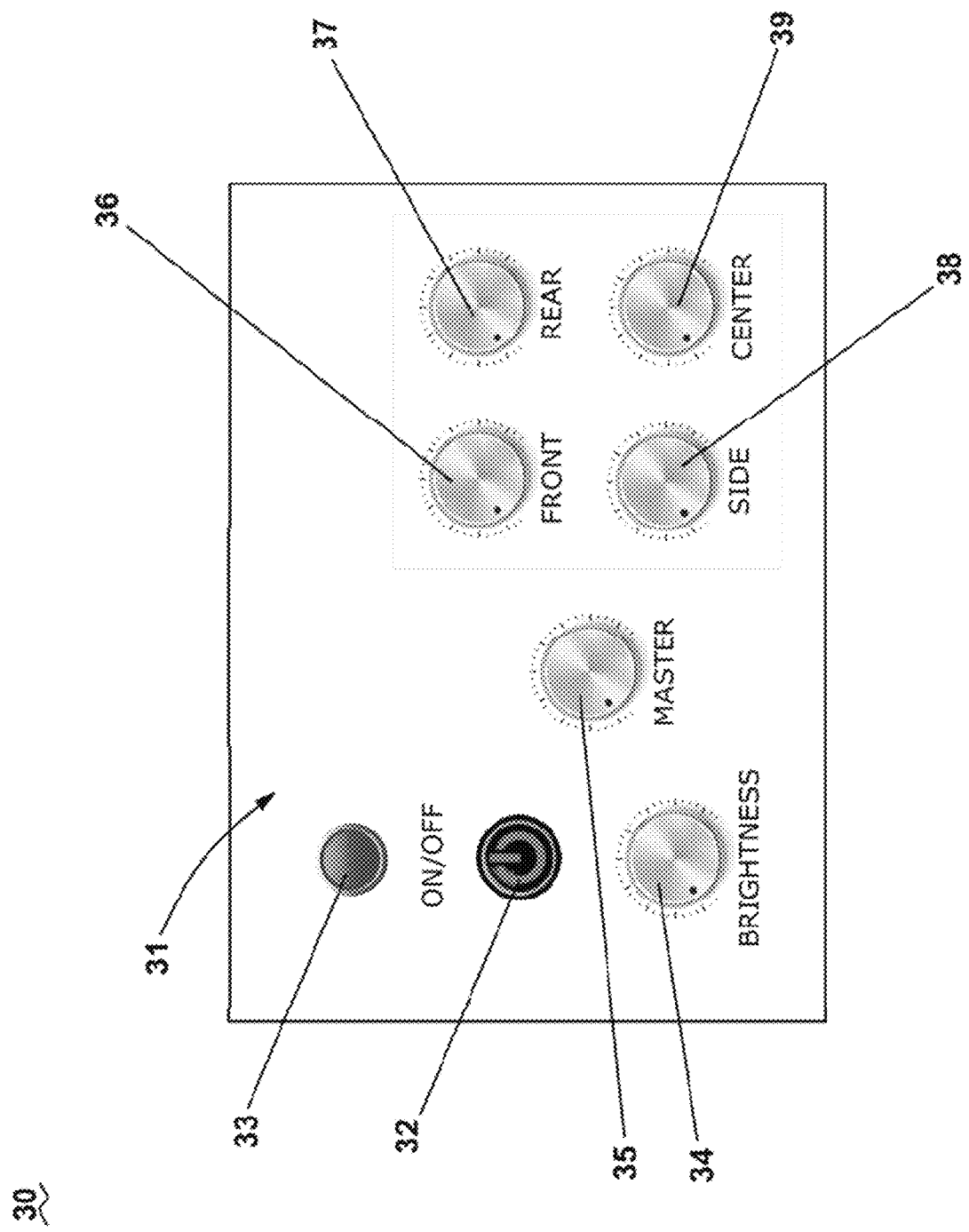
FIG. 2 is a schematic view of the interface unit of FIG. 1.

Turning to FIG. 2, one exemplary form of the interface unit 30 is shown. The interface unit 30 can include a user interface 31 positioned on its front panel or in any suitable location that is readily accessible by the user. The user interface 31 can include a power switch 32, power indictor 33, brightness controller 34, master controller 35, front controller 36, rear controller 37, side controller 38, and center controller 39. A user can adjust the sensitivity of any or all of the set of visual feedback devices 40 by way of the front/rear/side/center controllers 36, 37, 38, 39, or the master controller 35. For instance, a user can increase or "turn up" the rear controller 37 to make the rear-left and rear-right devices 43, 44 more sensitive to sound. In such a case, the devices 43, 44 can more readily illuminate, or illuminate to a higher level, for a given sound intensity compared to the other devices 41, 42, 45, 46, 47. In addition, a user can adjust a brightness level or sensitivity level of all visual feedback devices in the set of visual feedback devices 40 simultaneously via the brightness controller 34 or master controller 35, respectively.

FIG. 3A illustrates a location map 50 that can be utilized with the visual feedback system 1, including with the interactive console 10 (FIG. 1). An in-game avatar 58 is illustrated as a triangle at the center of the location map 50. It will be understood that a user operating the interactive console 10, e.g. via one or more handheld controllers, can direct the avatar 58 to move in a variety of directions, pick up in-game items, or run or jump or slide, in non-limiting examples.

In one example the location map 50 can be shown on the display panel 22; alternately, the location map 50 can be utilized by the interactive console 10 as part of a computational process without displaying on the display panel 22.

The location map 50 can represent a location of an in-game sound source 59 with respect to the avatar 58. Some exemplary locations are shown; for example, the location map 50 can include a front-left location 51, a front-right location 52, a rear-left location 53, a rear-right location 54, a side-left location 55, a side right location 56, and a center location 57. In the example shown, the in-game sound source 59 emanates generally toward the left of the avatar 58 and a little toward the front of the avatar 58.

The locations 51, 52, 53, 54, 55, 56, 57 can be defined with respect to a current orientation of the avatar 58. For example, the center location 57 can be defined as the direction the avatar 58 is presently facing. If a user operating the interactive console 10 (FIG. 1) causes the avatar 58 to change orientations, e.g. to turn around, the locations 51, 52, 53, 54, 55, 56, 57 can also change in order to preserve their relative orientation with respect to the avatar 58. In another example, the location map 50 can include fixed locations that do not change when the in-game avatar 58 changes directions, e.g. utilizing a "north location, "northwest location," and the like.

FIG. 3B illustrates the display assembly 20 and set of visual feedback devices 40 during operation of the interactive console 10 (FIG. 1). The avatar 58 is illustrated on the display panel 22 along with a portion of the location map 50. The in-game sound source 59 is illustrated on the audio device 24. It should be understood that the in-game sound source 59 can be output through the audio device 24 e.g. a voice, footsteps, or other in-game sound generated during operation of the interactive console 10.

The interface unit 30 (FIG. 3) can controllably operate the set of visual feedback devices 40 to indicate at least one of a directional property of the audio signal or a second property of the audio signal. For example, the location map 50 can be utilized by the interface unit 30 (FIG. 2) to illuminate the set of visual feedback devices 40 indicating the directional property of the sound signal, e.g. the location of the in-game sound source 59 on the location map (FIG. 3A). In the illustrated example, the lines 18 provide for signal communication within the set of visual feedback devices 40. the side-left device 45 is strongly illuminated and the front-left device 41 is weakly illuminated. In one example, "strongly illuminated" or "weakly illuminated" can refer to a relative brightness of a given light source. In one non-limiting example, the "strongly illuminated" side-left device 45 can be brighter than the "weakly illuminated" front-left device 41. In another example, "strongly illuminated" or "weakly illuminated" can refer to a behavior of one light source relative to another light source. In one non-limiting example, the "strongly illuminated" side-left device 45 can blink or flash rapidly whereas the "weakly illuminated" front-left device 41 can blink slowly or not at all, such as being constantly lit with low illumination. The other devices 42, 43, 44, 46, 47 can be unilluminated. In this manner, during operation of the interactive console 10, the location of an in-game sound source with respect to an in-game avatar can be visually represented by one or more visual feedback devices in the set 40.

Figure 4:
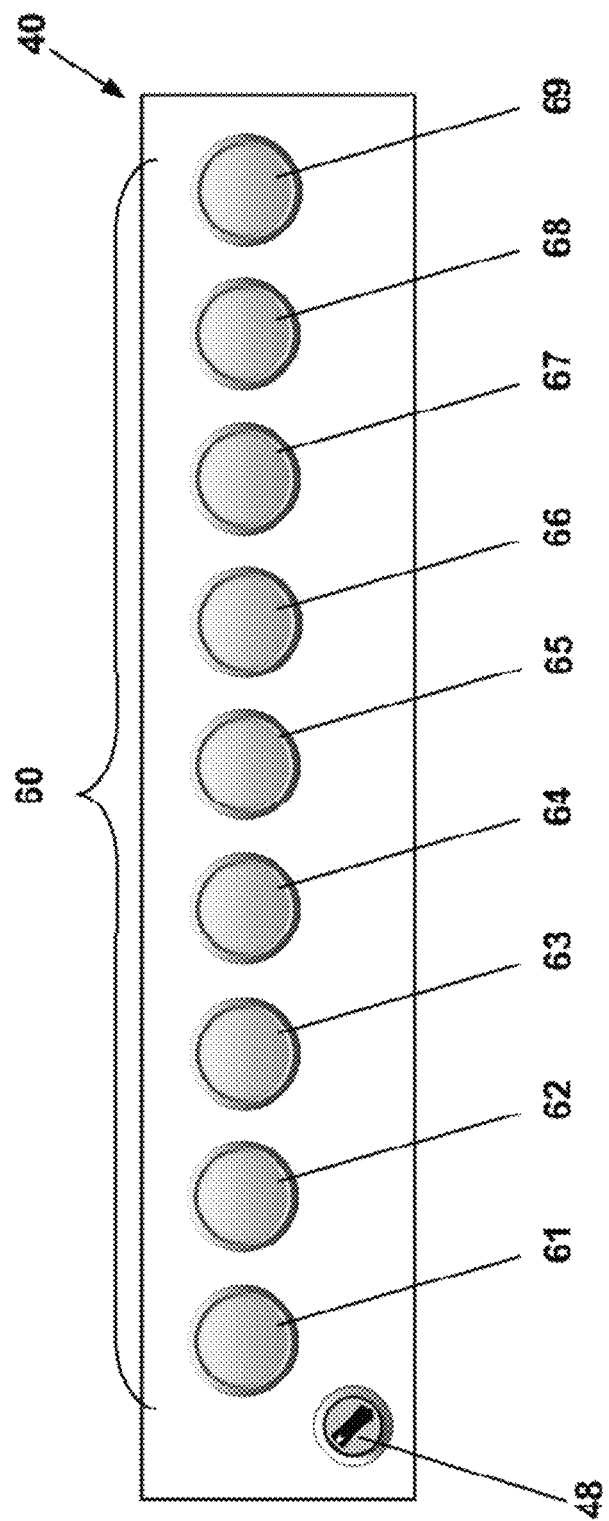
FIG. 4 is a schematic view of a set of light sources that can be utilized in the visual feedback device of FIG. 1.

FIG. 4 illustrates one exemplary visual feedback device 40, which can be utilized for any or all of the devices 41, 42, 43, 44, 45, 46 (FIG. 3B). An assignment switch 48 can be provided such that by selecting a predetermined position of the assignment switch 48, the visual feedback device 40 can perform as any of the devices 41, 42, 43, 44, 45, 46, 47 as described above.

A set of light sources 60 can be provided in the set of visual feedback devices 40. The set of light sources 60 can include any suitable light source including, but not limited to, an incandescent bulb, a light-emitting diode (LED), a fluorescent bulb, an ultraviolet-emitting bulb, an infrared-emitting bulb, or the like, or combinations thereof. The set of light sources 60 can be configured to display at least one visual behavior. As used herein, "visual behavior" will refer to an operational pattern for illuminating the set of light sources 60. Non-limiting examples of visual behaviors of the set of light sources 60 include illuminating with constant brightness, slowly increasing in brightness, quickly increasing in brightness, slowly dimming, quickly dimming, blinking, pulsing, strobing, changing color, or progressively illuminating a sequence of adjacent light sources, or the like, or combinations thereof.

In the example shown, the set of light sources 60 includes nine light sources in the form of LEDs 61, 62, 63, 64, 65, 66, 67, 68, 69. For example, the set of light sources 60 can include LEDs with an individual light output of 500 milli-candelas (mcd), a viewing angle of up to 30 degrees, and a response time of 10 ms or less. It will also be understood that the light sources can include any suitable light source, including incandescent bulbs in a non-limiting example.

During one example of operation of the interactive console 10, the set of light sources 60 can illuminate to indicate a strength, e.g. loudness or intensity, of the in-game sound source 59 (FIG. 3A) as well as a direction or location of the in-game sound source 59, e.g. by illuminating the center device 47 or rear-right device 44. For instance, a "strongly illuminated" feedback device 40 can correspond to illuminating all but the ninth LED 69, and a "weakly illuminated" feedback device 40 can correspond to illuminating only the first and second light LEDs 61, 62. Other modes of operation are contemplated for use in the visual feedback devices, including in the set of light sources 60. Several examples of operation will be described below; it will be understood that such examples are provided by way of example and are not intended to be limiting.

In one example of operation, different colors can be utilized for set of light sources 60. For instance, the first, second, and third LEDs 61, 62, 63 can be green, the fourth, fifth, and sixth LEDs 64, 65, 66 can be yellow, and the seventh, eight, and ninth LEDs 67, 68, 69 can be red. When the set of light sources 60 progressively illuminates, each of the green LEDs 61, 62, 63 can sequentially illuminate first, followed by the yellow LEDs 64, 65, 66 in sequence, followed by the red LEDs 67, 68, 69 in sequence. Such a green-yellow-red progressive lighting scheme is commonly found on audio equipment such as VU meters and sound-boards, and has the benefit of being a well-understood method of indicating a sound level. A user can quickly glance at the set of light sources 60 and determine, for example, "only green" corresponds to a low level of audio as compared to "green+yellow+a little red" indicating a high level of audio.

In another example of operation, an in-game sound source 59 occurs at the side-right location 56 (FIG. 3B). The side-right device 46 includes the set of light sources 60 all having the same color, e.g. white. The set of light sources 60 can rapidly progressively illuminate toward the right; that is, illuminating the set of light sources 60 in sequence beginning with LED 61 and ending with LED 69. In this manner, the side-right device 46 can provide an additional indication that a sound is emanating from the right within the game.

In another example, an in-game sound source 59 occurs at the center location 57 (FIG. 3B). The in-game sound source 59 is a loud, sudden/sharp sound, e.g. a door slamming. The side-right device 46 includes the set of light sources 60 divided into three red, three yellow, and three green as described above. To indicate the loudness of the sound, all nine LEDs 61, 62, 63, 64, 65, 66, 67, 68, 69 can illuminate simultaneously, followed by one or two rapid, simultaneous blinks (e.g. "all on, then all off") to indicate the sharpness of the sound and its fast disappearance. In this manner, the visual feedback system 1 can indicate a location (e.g. center), intensity (e.g. loudness), and quality (e.g. sharp vs. ongoing/background noise) of the in-game sound source 59.

In still another example, an in-game sound source 59 occurs with such great intensity that its location is obscured, e.g. a nearby explosion that could overwhelm the senses, followed by a "ringing ears" sound that indicates the avatar 58 is temporarily unable to hear. In such a case, all visual feedback devices in the set of visual feedback devices 40 can simultaneously illuminate to their maximum level, followed by a simultaneous gradual reduction in illumination to a lower, constant level e.g. illuminating the first three LEDs 61, 62, 63. In this manner, the visual feedback system 1 can indicate to a user that the avatar 58 is unable to process sounds, and that the user should look more closely for visual cues on the display panel 22 until the "ringing ears" sound subsides.

Figure 5:
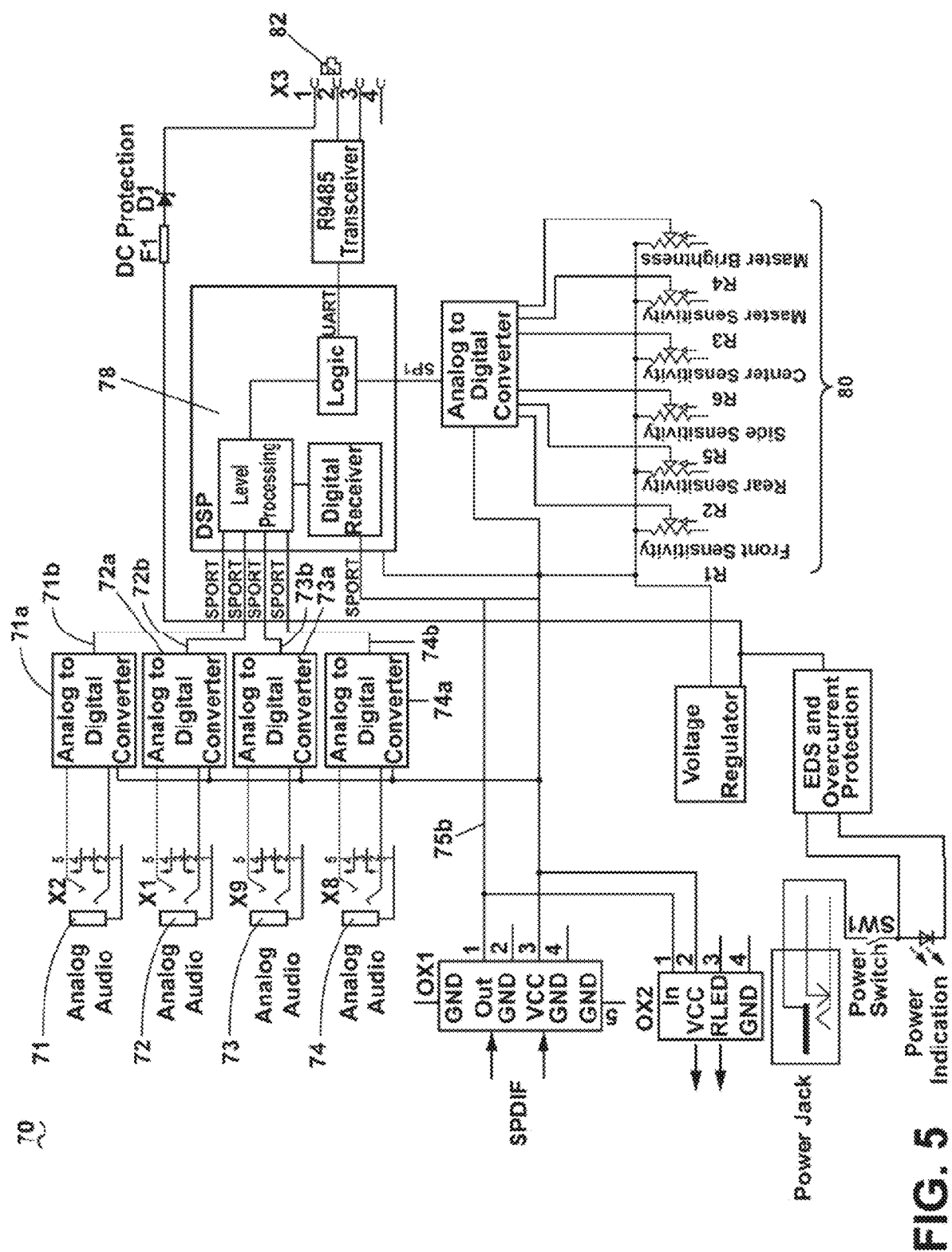
FIG. 5 is an exemplary block diagram of the interface unit of FIG. 1.

Turning to FIG. 5, an exemplary block diagram 70 illustrates one example of a methodology for implementing the interface unit 30 (FIG. 2). The power switch 32 and power indicator 33 (FIG. 2) are shown in the block diagram 70, wherein the power indicator 33 (shown as an LED) can be illuminated when the power switch 32 is depressed or switched to an "On" position.

Audio output from the interactive console 10 can be either analog or digital. If analog, the interactive console 10 can typically have up to four outputs, and up to seven audio channels. If digital, the interactive console 10 can typically have one output having up to five audio channels. The outputs from the interactive console 10 correspond to inputs into the interface unit 30. In the example shown, the inputs to the interface unit 30 are illustrated as including four analog inputs 71, 72, 73, 74 and one digital input 75. The analog inputs 71, 72, 73, 74 can feed into corresponding analog-to-digital converters (ADCs) 71a, 72a, 73a, 74a, respectively, which convert the analog audio signals into corresponding converted digital audio signals 71b, 72b, 73b, 74b. The converted digital audio signals 71b, 72b, 73b, and 74b can be fed into a processor 78. Additionally or alternatively, the digital input 75 can generate a digital audio signal 75b that can be fed into the processor 78.

The processor 78 can include suitable logic, circuitry, interfaces and/or code that can be operable to execute instructions or logic for controlling/coordinating the overall operation of the interface unit 30. It is contemplated the processor 78 can be a digital signal processor, or a digital signal processor (DSP) having an architecture optimized for the operational needs of digital signal processing. The logic associated with the processor 78 for the interface unit 30 can read, measure, filter, translate and output continuous signals from multiple inputs and channels.

A set of controller inputs 80 can also be received by the processor 78 from the brightness, master, front, rear, side, and center controllers 34, 35, 36, 37, 38, 39 (FIG. 2). In the example shown, the set of controller inputs 80 includes analog inputs, and another analog-to-digital converter (ADC) can be provided to convert the analog signals into digital signals to be received by the processor 78. In addition, a set of outputs 82 can be sent by the processor 78 and directed to other components in the visual feedback system 1, such as the display assembly 20 or the set of visual feedback devices 40 (FIG. 2).

In this manner, the interface unit 30 can (1) receive the audio signal sent by the interactive console 10 over the link 15, (2) process the audio signal and determine an associated location of the in-game sound, and (3) send an output signal via the link 17 to the set of visual feedback devices 40 in order to selectively illuminate the set of visual feedback devices 40.

Figure 6:
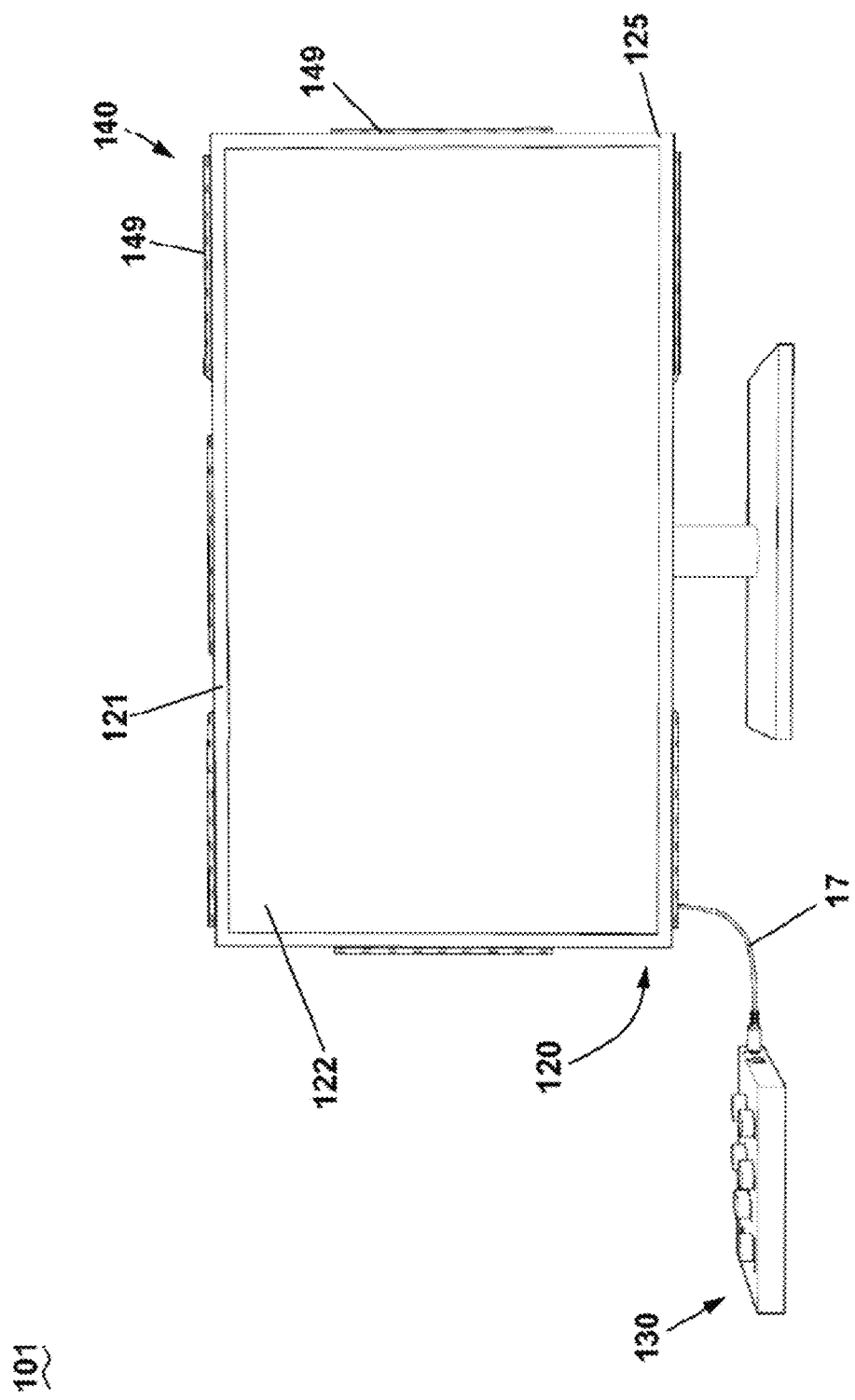
FIG. 6 is a schematic view of another exemplary visual feedback system including an interface unit, a display assembly, and a set of visual feedback devices in accordance with various aspects described herein.

Referring now to FIG. 6, another exemplary visual feedback system 101 is shown. The visual feedback system 101 is similar to the visual feedback system 1; therefore, like parts will be described with like numerals increased by 100, with it being understood that the description of the like parts of the visual feedback system 1 applies to the visual feedback system 101, except where noted.

The visual feedback system 101 includes a display assembly 120 with a display panel 122 and interface unit 130. A set of visual feedback devices 140 is arranged about a perimeter 125 of the display assembly 120. While not shown, the visual feedback system 101 can be utilized with a gaming console connected to the interface unit 130 similar to that described in FIG. 1. The visual feedback devices 140 in the illustrated example include low-profile light source housings 149 each including nine light sources in the form of nine LEDs that can progressively illuminate as described in FIG. 4. The link 17 from the interface unit 130 is also shown.

Figure 7:
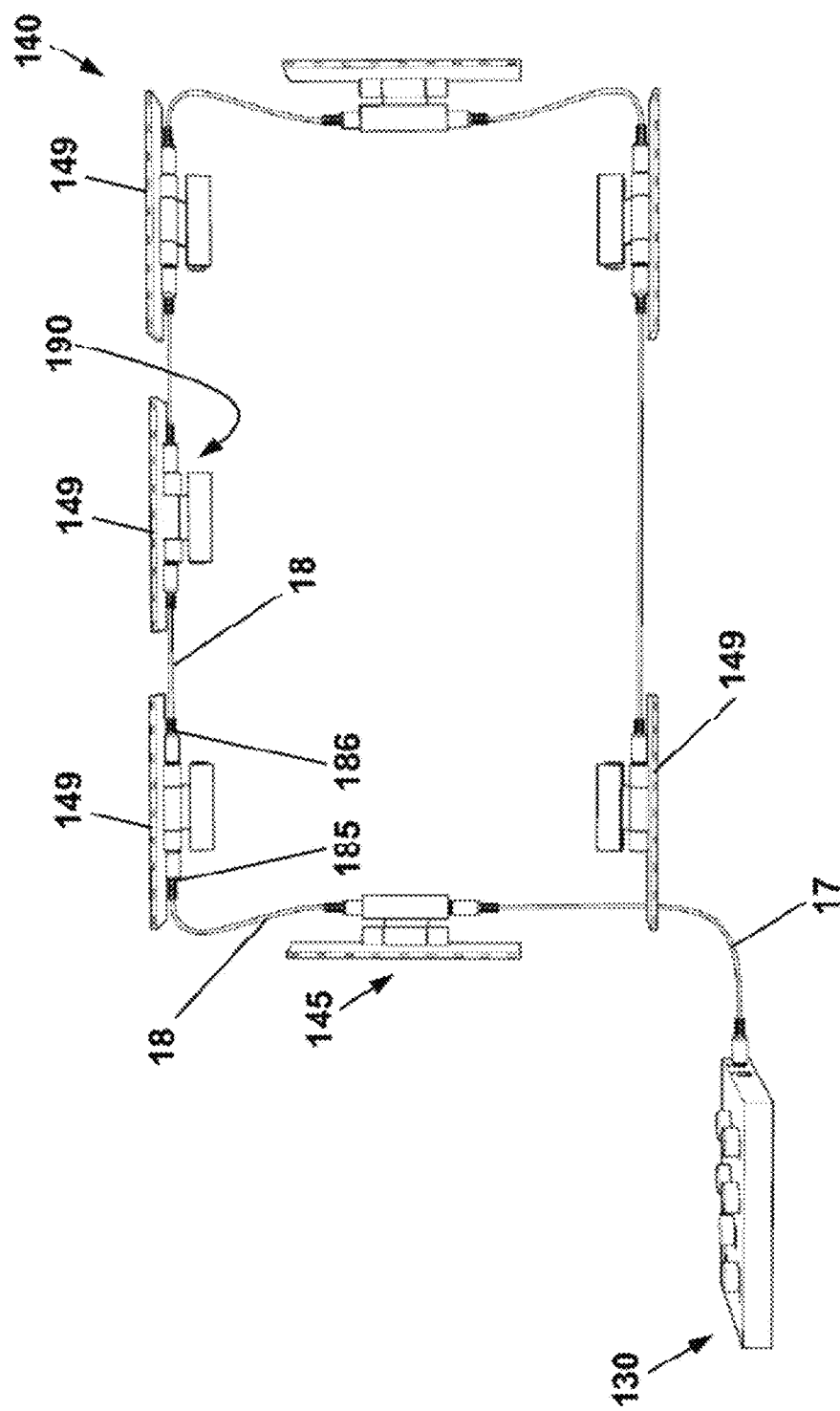
FIG. 7 is a schematic front view of the interface unit and visual feedback device of FIG. 6 isolated from the display assembly.

FIG. 7 illustrates that the visual feedback devices 140 can include a swivel connection or hinge assembly 190 for mounting to the display assembly 120 (FIG. 6). The set of visual feedback devices 140 can also include corresponding links or interconnections in the form of a first interconnection 185 and a second interconnection 186. In the example shown, the link 17 can connect the interface unit 130 to the side-left device 145, and each of the following devices can be electrically coupled in series about the perimeter 125 of the display assembly 120 (FIG. 6) via their respective interconnections 185, 186. While the link 17 is illustrated as a wired link or cable, it is also contemplated that the link 17 can include a wireless connection. Furthermore, the lines 18 are shown interconnecting devices within the set of visual feedback devices 140.

Figure 8:
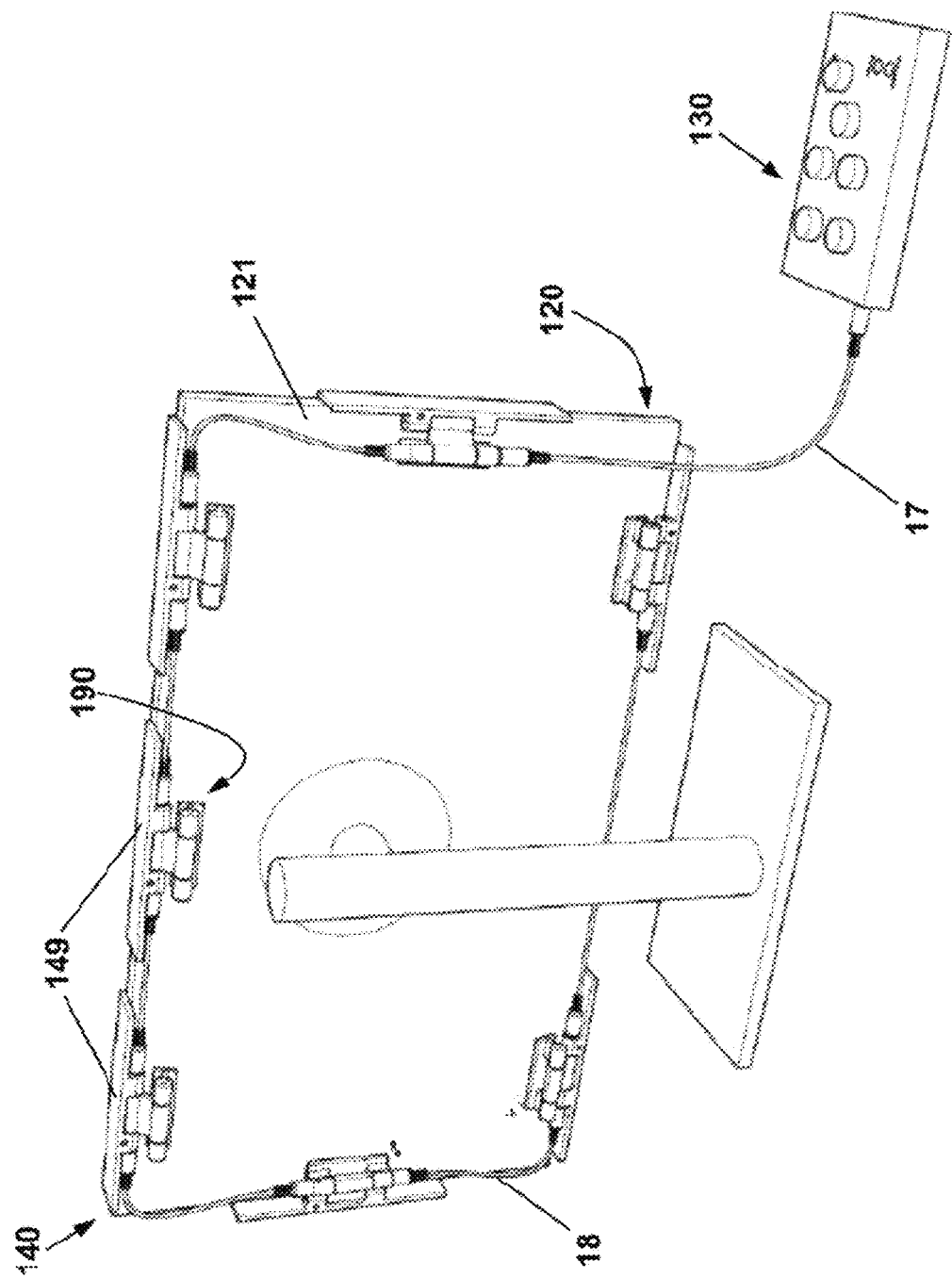
FIG. 8 is a rear perspective view of the visual feedback device and display assembly of FIG. 6 illustrating a hinge assembly.

FIG. 8 illustrates the rear of the display assembly 120 with the set of visual feedback devices 140 visible along with the light source housing 149, lines 18, and link 17. The hinge assemblies 190 can provide for hinged, swiveling, or rotational adjustments in viewing angle for the LEDs, which can vary depending on how far from the display assembly 120 a user is located during operation of the interactive console 10 (FIG. 1).

Figure 9:
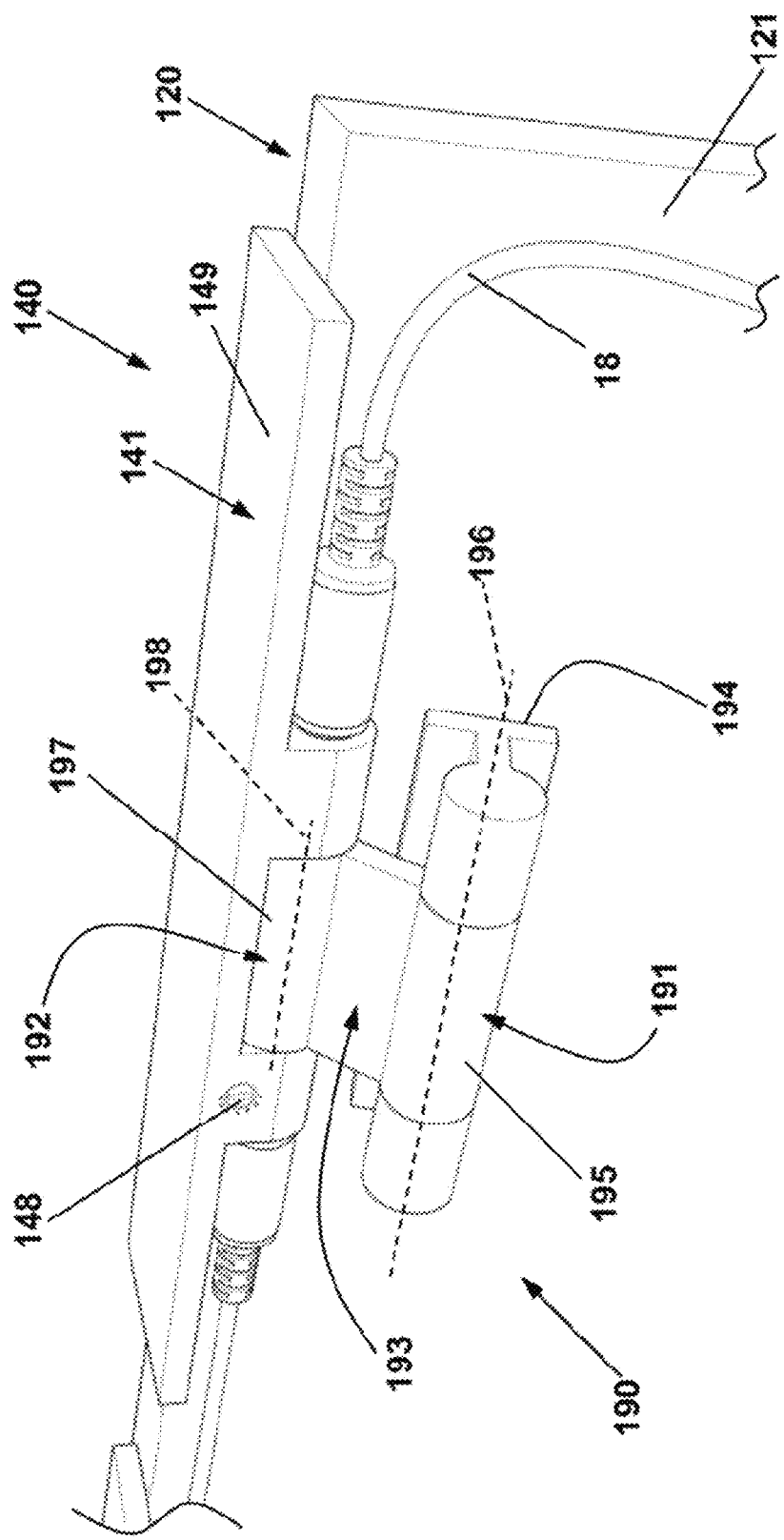
FIG. 9 is a schematic view of the hinge assembly of FIG. 8.

FIG. 9 more clearly shows the hinge assembly 190 as well as an assignment switch 148 on one visual feedback device (e.g. a front-left device 141) in the set of visual feedback devices 140. The hinge assembly 190 includes a first portion 191 that mounts to the display assembly 120, a second portion 192 that mounts to the light source housing 149, and a connecting portion 193 between the first and second portions 191, 192. In the example shown, the first portion 191 includes an adhesion surface 194 that provides for adhering to a rear surface of the housing 121 of the display assembly 120. The first portion 191 also includes a first swivel point 195 along a first axis 196 that provides for rotation of the connecting portion 193. The second portion includes a second swivel point 197 along a second axis 198. The second axis 198 can be parallel to the first axis 196. In this manner, the light source housing 149 can be adjusted in both viewing angle, via the second swivel point 197, and height with respect to the display assembly 120, via the first swivel point 195. A user may prefer to have a space or gap between the housing 121 and the front-left device 141; alternately, a user may prefer that the front-left device 141 be positioned "flush" or adjacent the display assembly 120.

Figure 10:
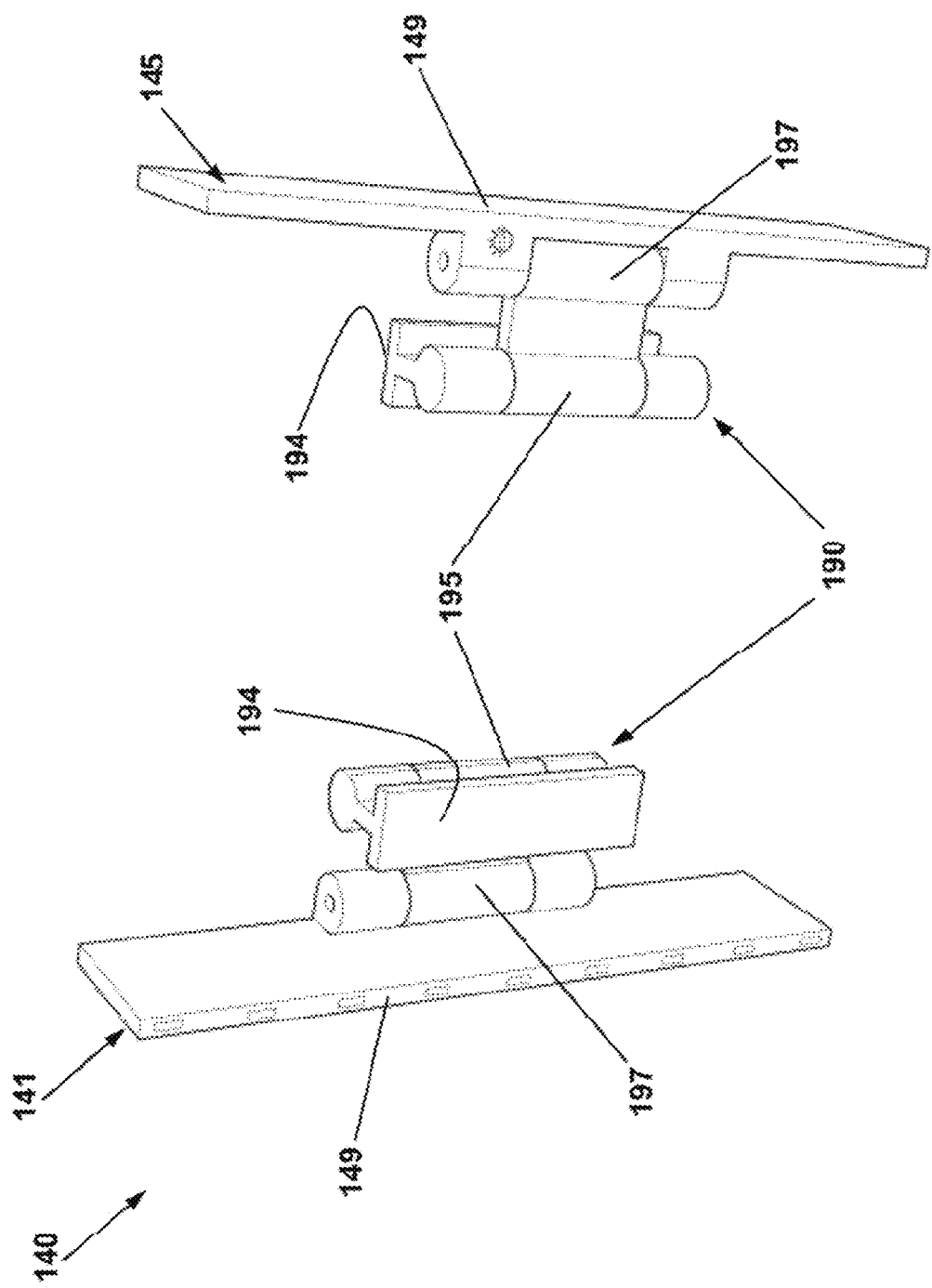
FIG. 10 illustrates additional details of the hinge assembly of FIG. 9.

FIG. 10 illustrates two visual feedback devices (e.g. the front-left device 141 and the side-left device 145) in the set of visual feedback devices 140 with their hinge assemblies 190. It is further contemplated that the LEDs can have a rectangular profile to better visually match the low-profile light source housing 149. The first and second swivel points 195, 197 as well as the adhesion surfaces 194 are also shown.

Figure 11:
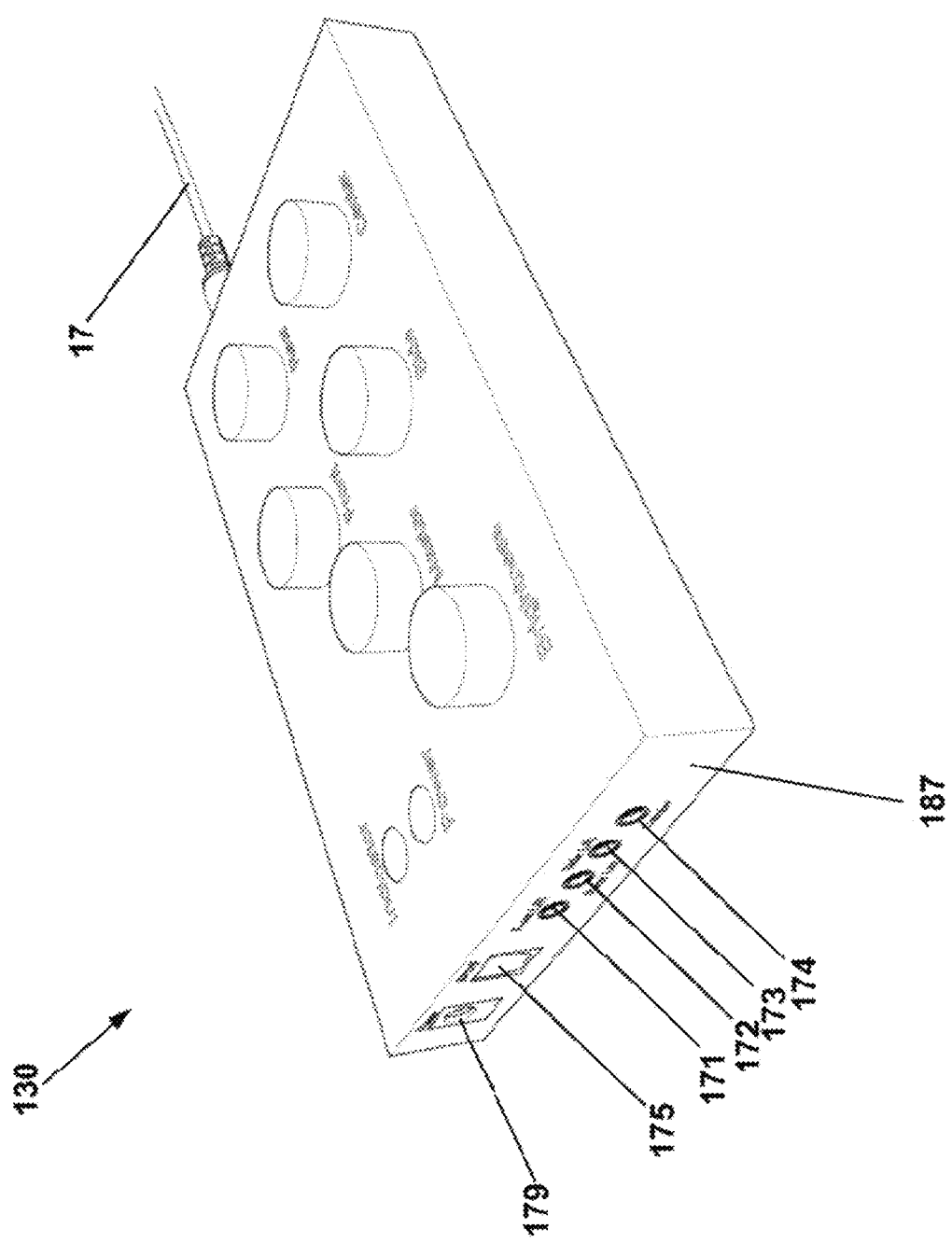
FIG. 11 is a perspective view of the interface unit of FIG. 6 illustrating a first side with audio and video ports.
Figure 12:
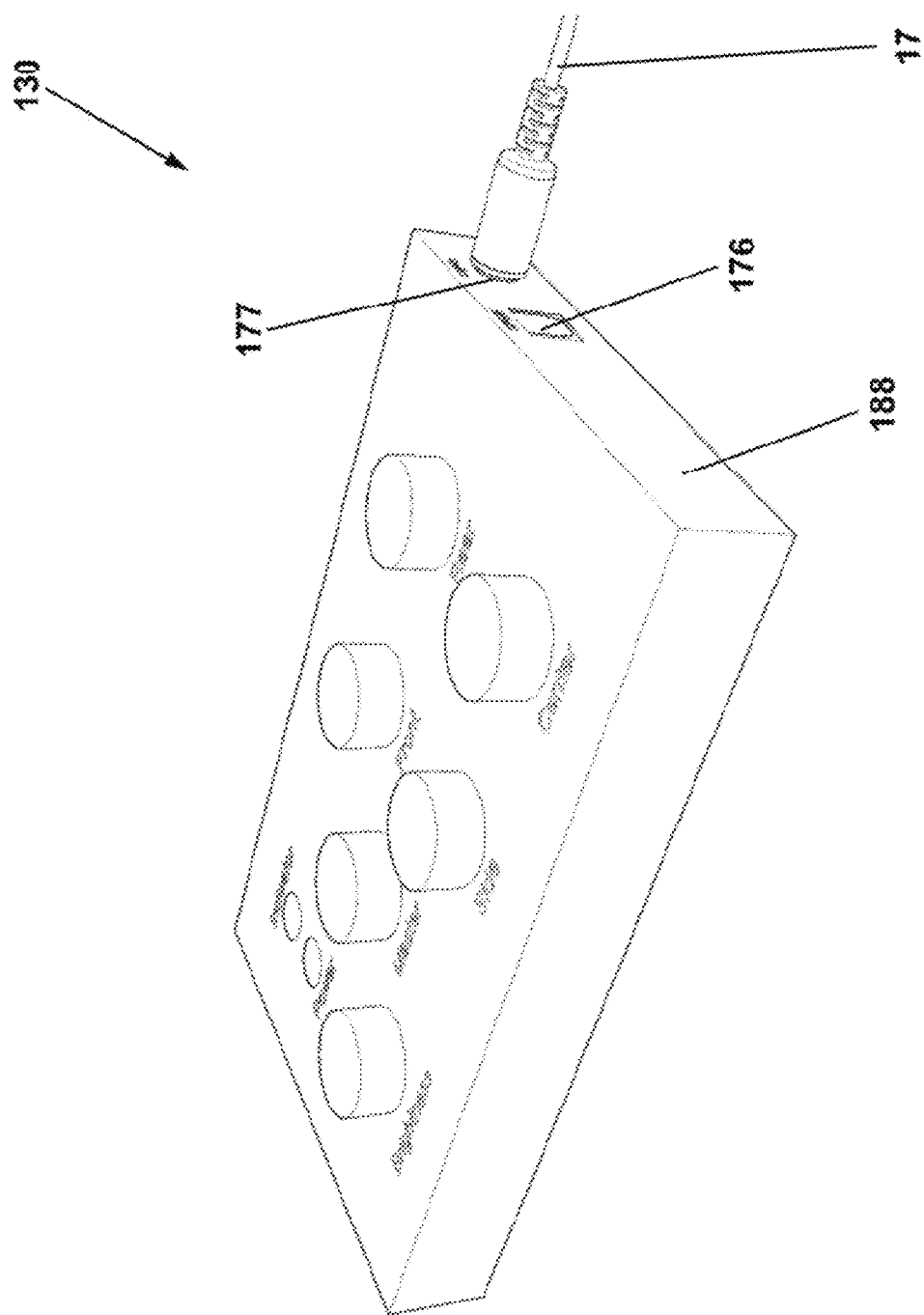
FIG. 12 is a perspective view of the interface unit of FIG. 6 illustrating a second side with power and video ports.

FIGS. 11 and 12 illustrate the interface unit 130 in more detail. FIG. 11 illustrates a power connection 179, digital audio input 175 and four analog audio inputs 171, 172, 173, 174 provided along a first side 187 of the interface unit 130. A power input connected to the power switch 32 can also be provided. FIG. 12 illustrates that an audio pass-through 176 and an output 177 for the link 17, e.g. a four-conductor interconnect cable, can be provided along a second side 188 of the interface unit 130.

Figure 13:
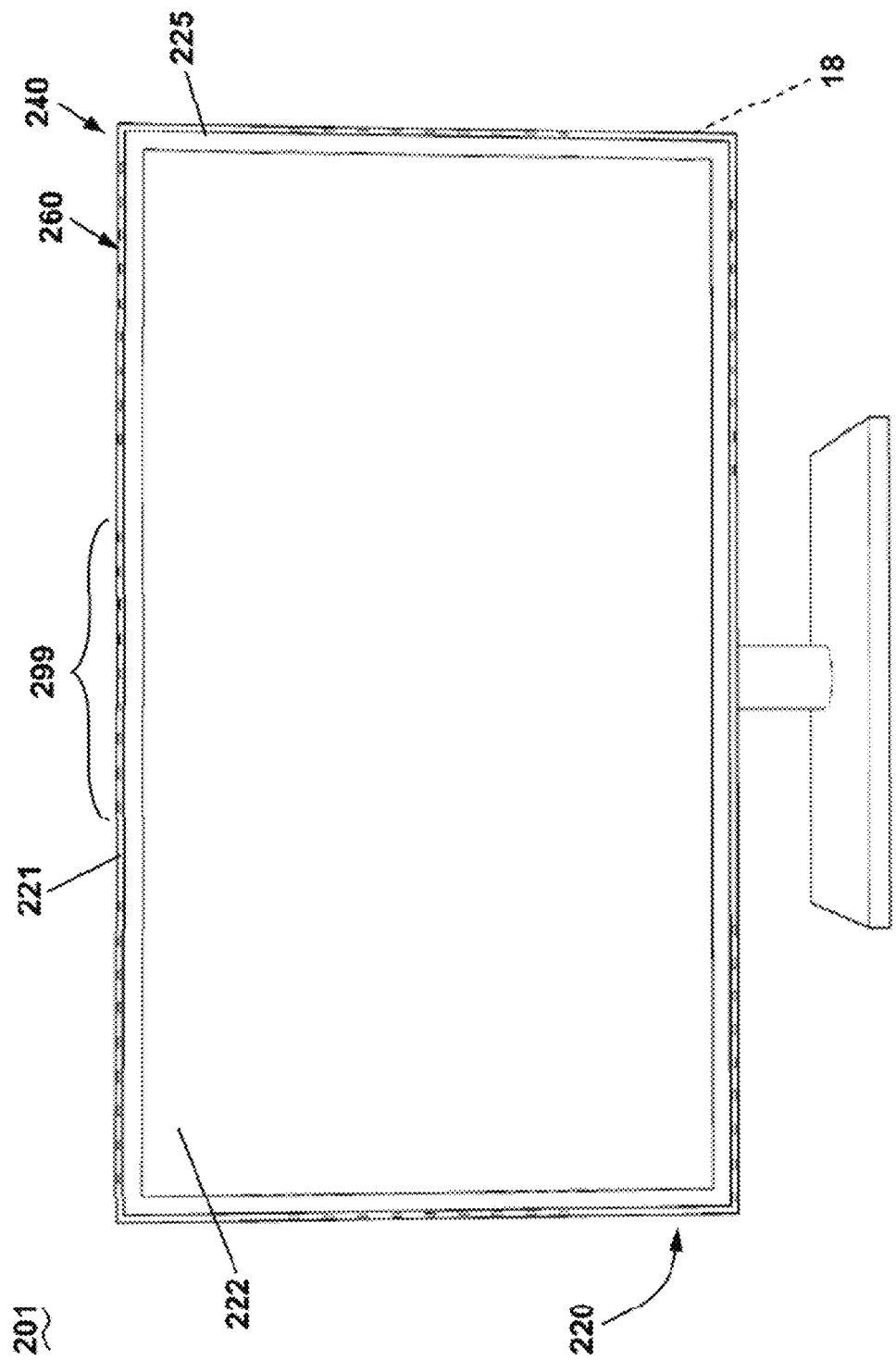
FIG. 13 is a schematic front view of another exemplary visual feedback system including an interface unit, a display assembly, and a set of visual feedback devices in accordance with various aspects described herein.

Turning to FIG. 13, another exemplary visual feedback system 201 is shown. The visual feedback system 201 is similar to the visual feedback systems 1, 101; therefore, like parts will be described with like numerals further increased by 100, with it being understood that the description of the like parts of the visual feedback system 1, 101 applies to the visual feedback system 201, except where noted.

The visual feedback system 201 includes a display assembly 220 with a housing 221 and a display panel 222. A set of visual feedback devices 240 is arranged about a perimeter 225 of the display assembly 220. It will be understood that the visual feedback system 201 and portions thereof can be utilized with an interactive console or gaming console similar to that described in FIG. 1.

One difference compared to the visual feedback systems 1, 101 is that the visual feedback devices 240 can be integrated into the housing 221 of the display assembly 220. In the example shown, the set of visual feedback devices 240 includes multiple groups 299 of light sources in the form of LEDs that can progressively illuminate as described in FIG. 4. Nine light sources are illustrated in each group 299, though this need not be the case. Any number of light sources can be utilized. Each group 299 of light sources can also include suitable interconnects or electrical or signal connections within the housing 221 of the display assembly 220, such as the lines 18 (shown in phantom).

Figure 14:
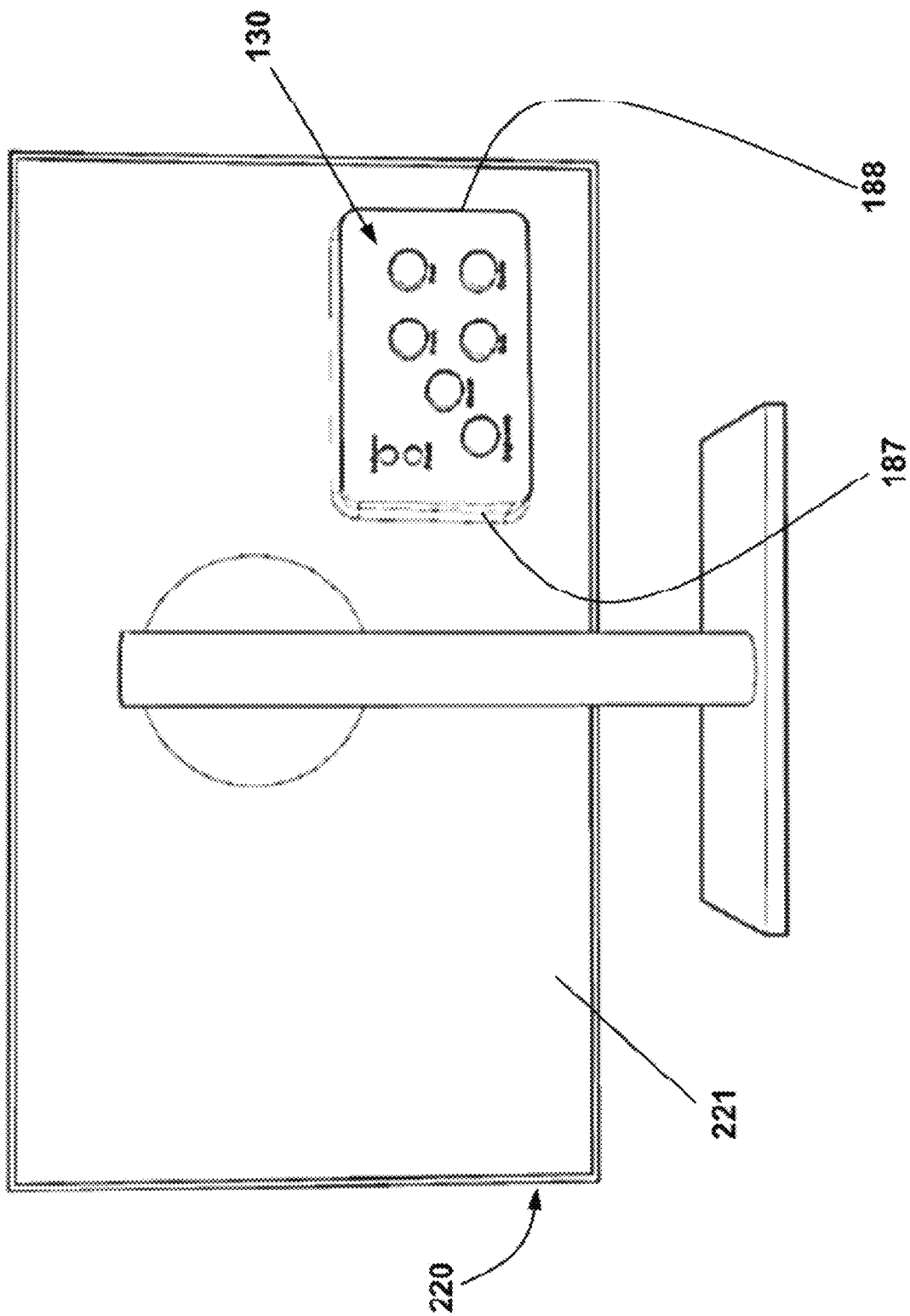
FIG. 14 is a rear view of the visual feedback system of FIG. 13 illustrating the interface unit integrated into the rear of the display assembly.

FIG. 14 illustrates the rear of the display assembly 220. Another difference is that the interface unit 130 can be secured to, or made integral with, the housing 221 of the display assembly 220. In such a case, the housing 221 can enclose the link between the interface unit 130 and the visual feedback devices 240, as well as the digital audio input, analog audio input, audio pass-through, in non-limiting examples. In an example where the interface 130 is mounted on an exterior of the display assembly 220, the first and second sides 187, 188 of the interface unit 130 can include the digital or analog audio input, pass-through, power connection, and the like. A wired or wireless connection can be provided to connect the mounted interface unit 130 to the interior wiring or electrical connections within the housing 221 of the display panel 220.

Figure 15:
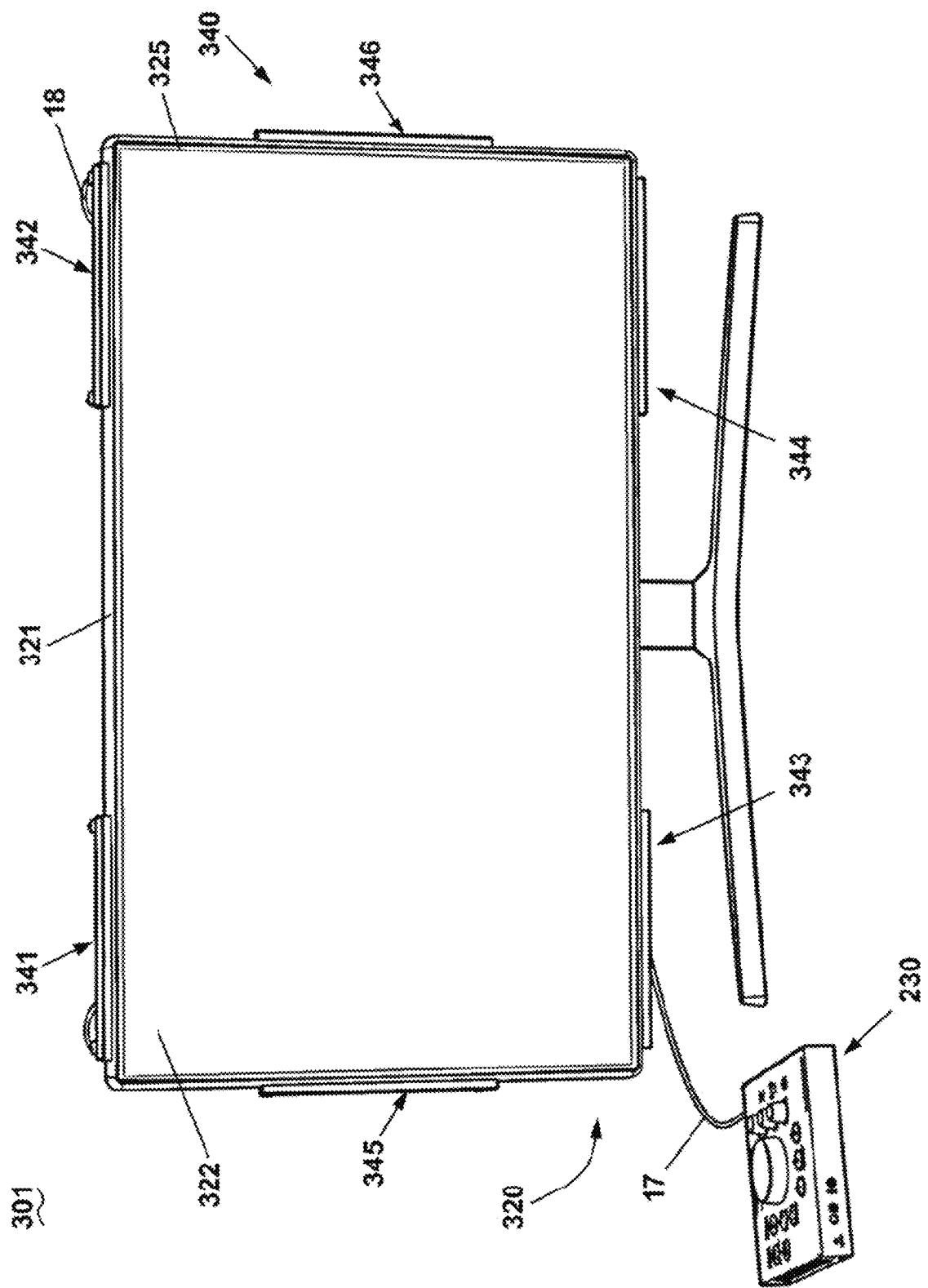
FIG. 15 is a schematic front view of another exemplary visual feedback system including an interface unit, a display assembly, and a set of visual feedback devices in accordance with various aspects described herein.

Referring now to FIG. 15, another exemplary visual feedback system 301 is shown. The visual feedback system 301 is similar to the visual feedback systems 1, 101, 201; therefore, like parts will be described with like numerals further increased by 100, with it being understood that the description of the like parts of the visual feedback system 1, 101, 201 applies to the visual feedback system 301, except where noted.

The visual feedback system 301 includes a display assembly 320 with a housing 321 and a display panel 322. A set of visual feedback devices 340 is arranged about at least a portion of a perimeter 325 of the display assembly 320. An interface unit 230 similar to the interface units 30, 130 is electrically coupled to the set of visual feedback devices 340 via the link 17. It will be understood that aspects of the disclosure provide for the use of any of the interface units 30, 130, 230 in the visual feedback system 301. Further, the interface unit 230 or other portions of the visual feedback system 301 can be utilized with an interactive console or gaming console similar to that described in FIG. 1.

The set of visual feedback devices 340 includes a front-left device 341, a front-right device 342, a rear-left device 343, a rear-right device 344, a side-left device 345, and a side-right device 346. One difference compared to the visual feedback system 1, 101, 201 is that no center device is provided. Such an arrangement can reduce any undesired visual distraction from directional indication of, for example, in-game sounds emanating from a user's own avatar, such as a user's own footsteps or avatar actions, that may be more likely to be picked up evenly across all channels by the interface unit 230.

Another difference is that the set of visual feedback devices 340 can include light sources enclosed or housed within a casing 349. In the illustrated example, multiple casings 349 can be provided and coupled to at least a portion of a perimeter 325 of the display assembly 320. The casings 349 can be coupled to the display assembly 320 using any suitable mechanism including, but not limited to, a fastener, a hinge assembly, an adhesive, or the like, or combinations thereof.

FIG. 16 illustrates the set of visual feedback devices 340 and interface unit 230 isolated from the display assembly 320 of FIG. 15. The link 17 is illustrated providing electrical connection between the interface unit 230 and set of visual feedback devices 340. The lines 18 are shown providing for signal interconnection within the set of visual feedback devices 340.

FIG. 17 illustrates a front perspective view of one casing 349. The casing 349 includes a front surface 349A and a rear surface 349B. A portion 383 of the casing 349 can include an optically transparent or translucent structure including, but not limited to, glass, plastic, a composite material, or a solid material with multiple slit-like or grate-like openings, or the like, or combinations thereof. A set of light sources 360 (shown in phantom) are housed within the casing 349. It is contemplated that the portion 383 can provide for a diffusing or "smoothing" effect wherein light emitted by the set of light sources 360 is observed to be blended, diffused, or glowing in an ambient fashion, as opposed to observing discrete or pinpoint-like light emanating from the set of light sources 360. In the example shown, the front surface 349A and the opposing ends of the casing 349 are illustrated as including the translucent portion 383. In addition, any number of light sources 360 can be provided, and in any arrangement, within the casing 349.

Turning to FIG. 18, it is contemplated that the casings 349 can provide for electrical coupling between the lines 18 and the light sources 360 housed therein. More specifically, the rear surface 349B can include a first interconnection 385 similar to the first interconnection 185 and a second interconnection 386 similar to the second interconnection 186. The interconnections 385, 386 can be coupled via lines 18 (FIG. 16) such that multiple casings 349 can be electrically coupled to one another as well as to the interface unit 230 (FIG. 16).

Figure 19:
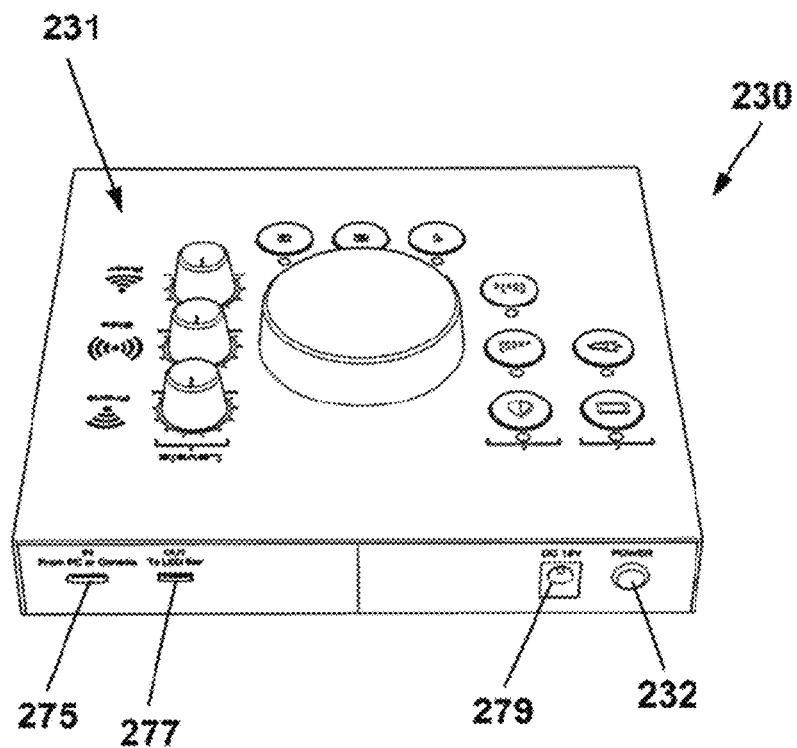
FIG. 19 is a schematic top view of the interface unit of FIG. 15.
Figure 20:
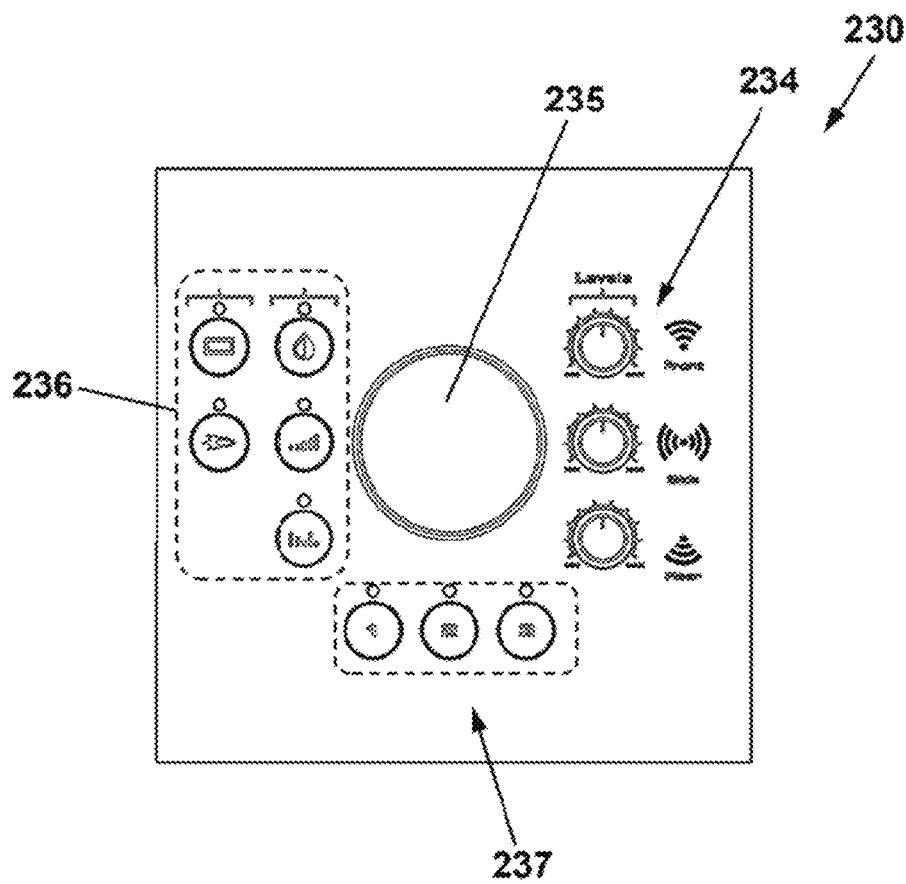
FIG. 20 is a perspective rear view of the interface unit of FIG. 15 illustrating a power input, a data input, and a data output.

FIGS. 19 and 20 illustrate the interface unit 230 in further detail. FIG. 19 illustrates that the interface unit 230 can include a user interface 231 as shown. A power connection 279, a power switch 232, and at least one audio input configured to receive an audio signal is provided along one side of the interface unit 230. In the illustrated example, the interface unit 230 includes one digital audio input 275 and one output 277 configured to electrically couple to the link 17 (FIG. 16). Additionally, or alternatively, the interface unit

230 can include multiple inputs, including digital audio inputs, analog audio inputs, or composite inputs having both an audio signal and a video signals, or the like. For example, the interface unit 230 can include at least one input configured to receive HDMI, S-video, composite video, component video, Bluetooth, NFC, Wi-Fi, or the like. In an example where the interface unit 230 includes a video input, the interface unit 230 can include a video pass-through or other suitable mechanism to output the video signal to a display, such as the display assembly 20, 120, 220, 320. The interface unit 230 can be further configured to separate an audio signal from a combined audio-video signal, and to illuminate the set of visual feedback devices 40, 140, 240, 340 in accordance with the audio signal.

FIG. 20 illustrates the interface unit 230 in a top view, with various controls shown in further detail. One difference is that the interface unit 230 includes at least one brightness controller 234 and a configurable a master controller 235. Another difference is that the interface unit 230 includes a set of behavior controllers 236 as well as a set of preset controllers 237. The set of behavior controllers 236 can controllably operate the set of light sources 260 to display a particular behavior. Multiple behavior controllers 236 can be provided, such as knobs, switches, or the like. In the example shown, five knobs are provided in the set of behavior controllers 236. Each in the set of behavior controllers 236 can adjust a specific behavior of the set of light sources 260. For example, one dial can adjust a blinking behavior, one dial can adjust a color-changing behavior, and one dial can adjust a pulsing behavior of the set of light sources 260.

The set of preset controllers 237 can store favorite settings for the set of light sources 260, such as a user-customized combination of brightness settings and behavior settings. In the Three presets are illustrated in the example of FIG. 19, although any number of presets can be provided.

Figure 21:
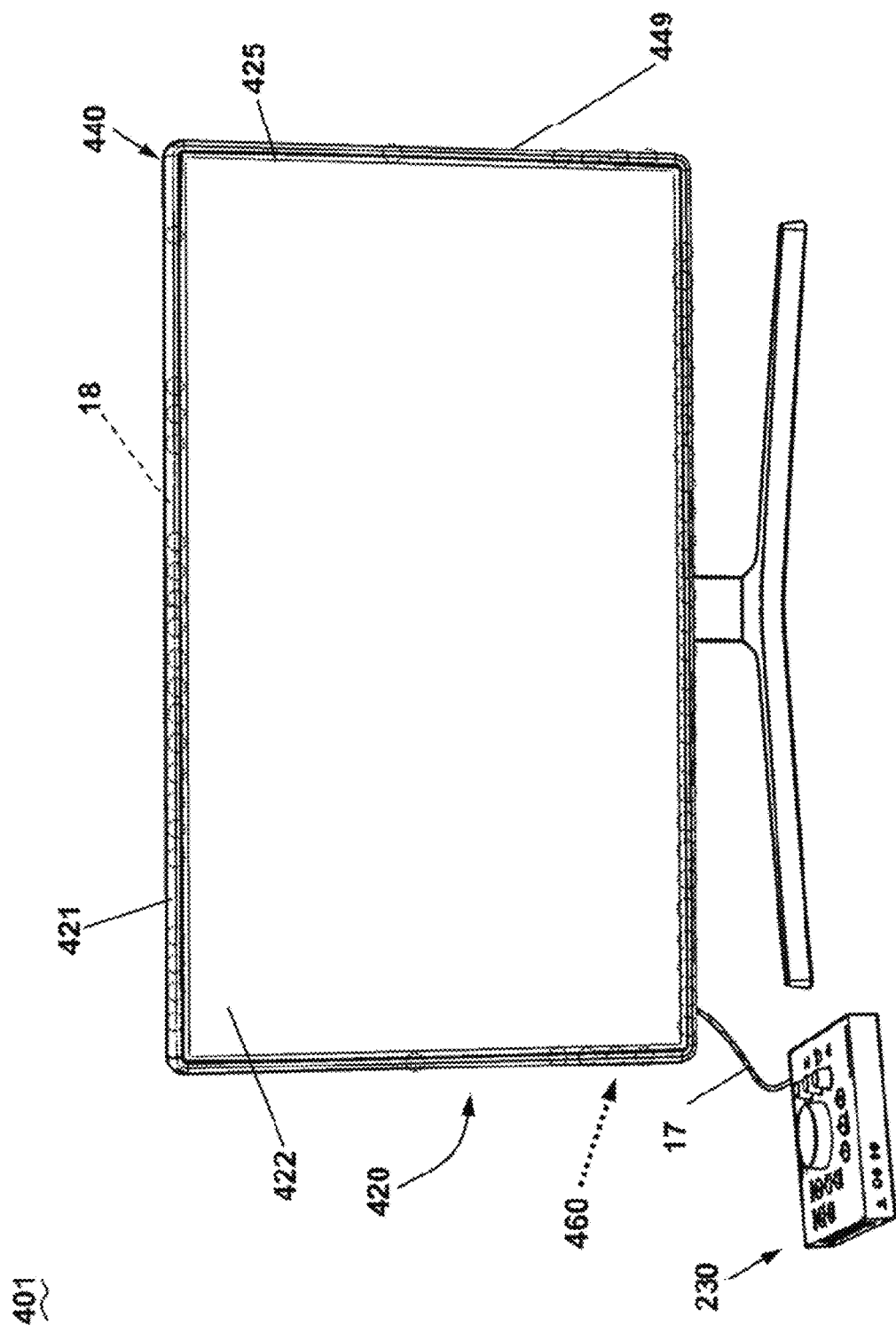
FIG. 21 is a schematic front view of another exemplary visual feedback system including an interface unit, a display assembly, and a set of visual feedback devices in accordance with various aspects described herein.

Turning to FIG. 21, another exemplary visual feedback system 401 is shown. The visual feedback system 401 is similar to the visual feedback systems 1, 101, 201, 301; therefore, like parts will be described with like numerals further increased by 100, with it being understood that the description of the like parts of the visual feedback system 1, 101, 201, 301 applies to the visual feedback system 401, except where noted.

The visual feedback system 401 includes a display assembly 420 with a housing 421 and a display panel 422. A set of visual feedback devices 440 is arranged about at least a portion of a perimeter 425 of the display assembly 420. The set of visual feedback devices 440 includes a set of light sources 460 enclosed in a casing 449. One difference is that the casing 449 surrounds the perimeter 425 of the display assembly 420. The set of light sources 460 can be provided in any portion of the casing 449, including spread uniformly about the casing 449, or arranged into spaced groups within the casing 449, in non-limiting examples.

The casing 449 can be secured to the perimeter 425 of the display assembly 420 using any suitable mechanism, including adhesives, fasteners, or the like. The casing 449 can be formed as a single-piece casing having the set of light sources 460. Additionally, or alternatively, the casing 449 can be formed as a modular structure that couples together, e.g. snaps or interlocks, to surround the perimeter 425 of the display assembly 420.

The interface unit 230 is shown electrically coupled to the set of visual feedback devices 440 via the link 17. It will be understood that aspects of the disclosure provide for the use of any of the interface units 30, 130, 230 in the visual feedback system 401. Further, the interface unit 230 or other portions of the visual feedback system 401 can be utilized with an interactive console or gaming console similar to that described in FIG. 1.

Figure 22:
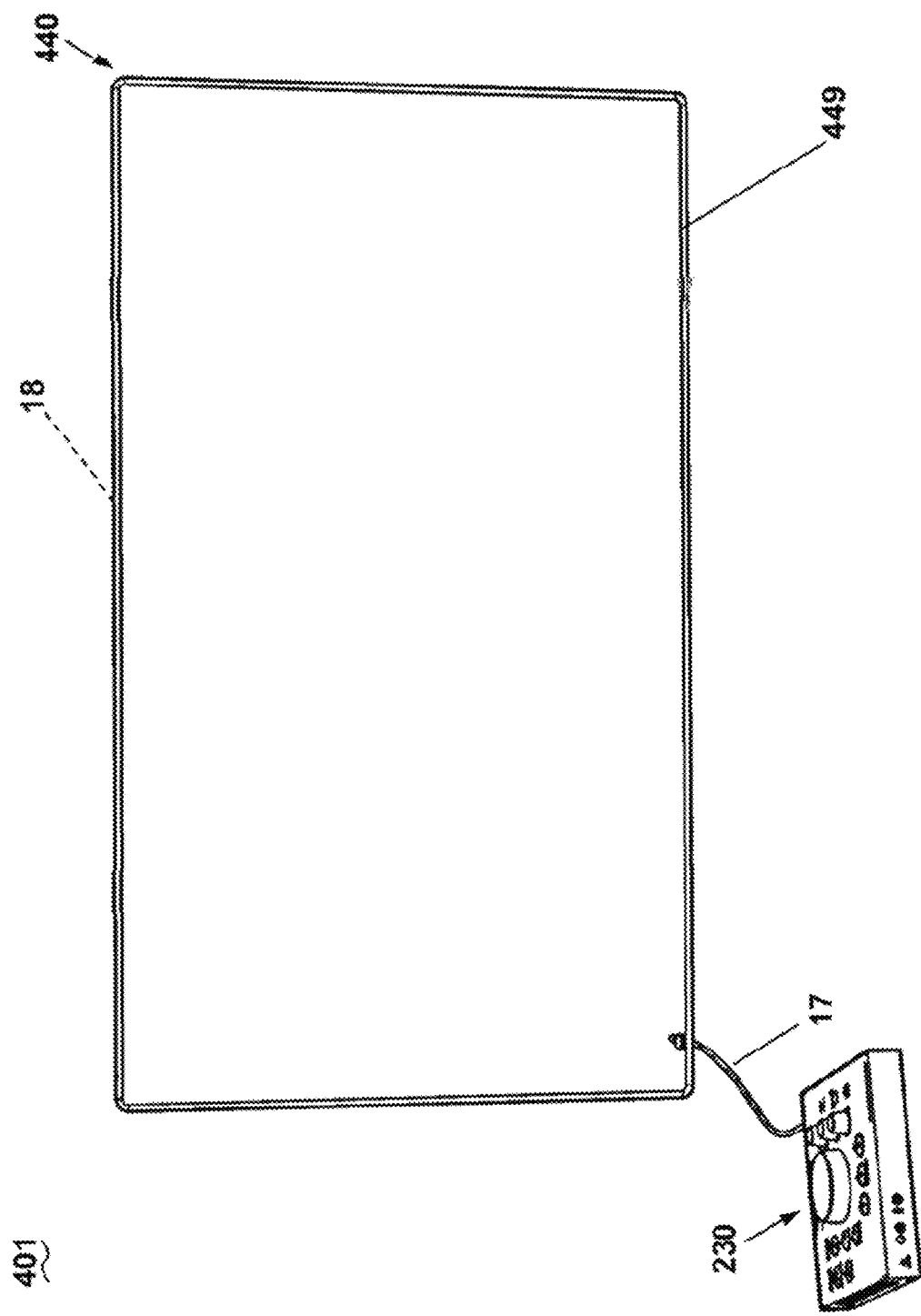
FIG. 22 is a schematic front view of the set of visual feedback devices and interface unit of FIG. 21 isolated from the display assembly.

FIG. 22 illustrates the set of visual feedback devices 440 and interface unit 230 isolated from the display assembly 420. The casing 449 is shown configured to fully surround the perimeter of the display assembly 420, with the link 17 connecting to an input of the casing 449. Lines 18 can be provided within the casing 449 to connect light sources 460 within the set of visual feedback devices 440.

Figure 23:
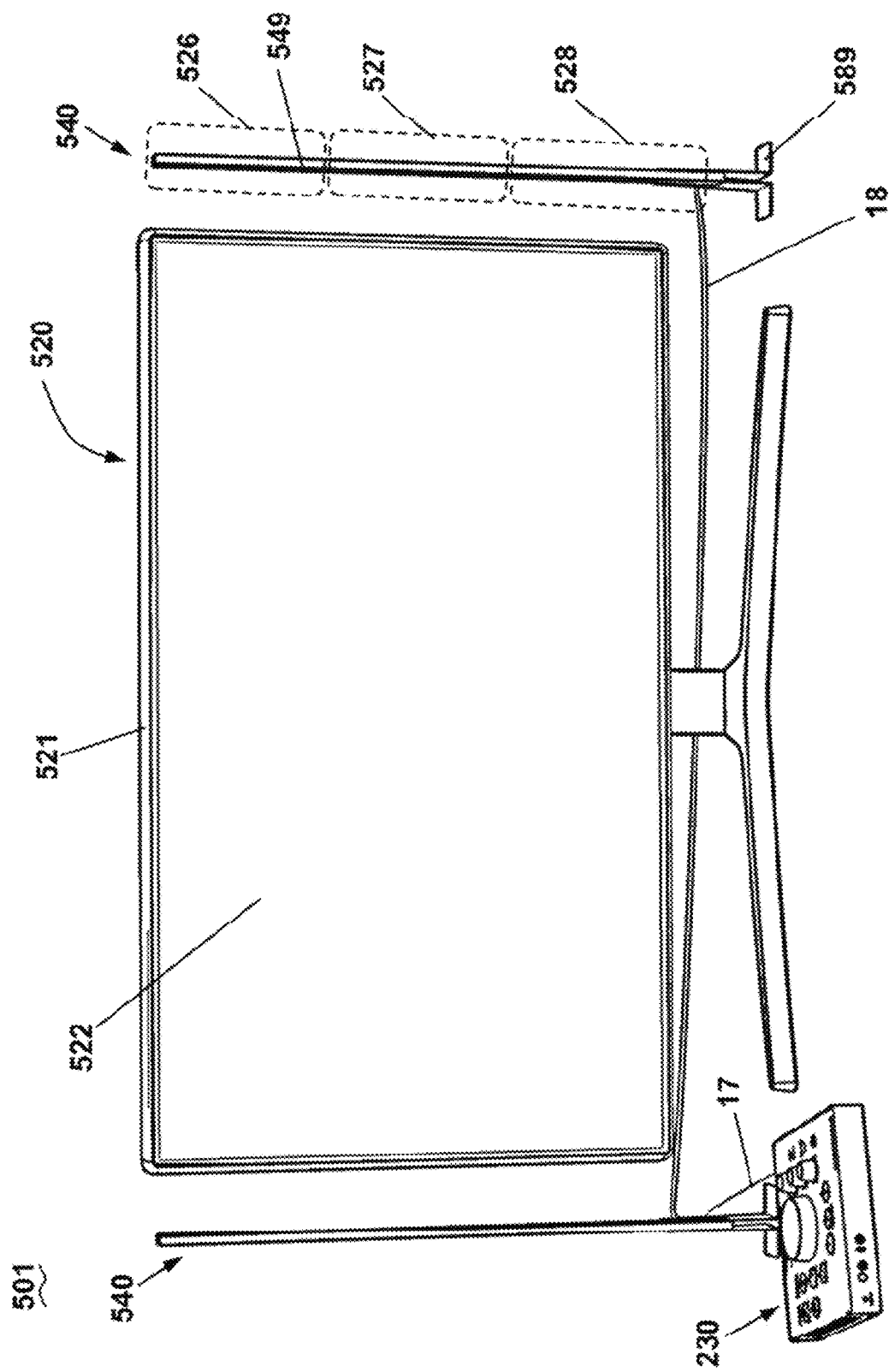
FIG. 23 is a schematic front view of another exemplary visual feedback system including an interface unit, a display assembly, and a set of visual feedback devices in accordance with various aspects described herein.

Turning to FIG. 23, another exemplary visual feedback system 501 is shown. The visual feedback system 501 is similar to the visual feedback systems 1, 101, 201, 301, 401; therefore, like parts will be described with like numerals further increased by 100, with it being understood that the description of the like parts of the visual feedback system 1, 101, 201, 301, 401 applies to the visual feedback system 501, except where noted.

The visual feedback system 501 includes a display assembly 520 with a housing 521 and a display panel 522. The interface unit 230 is illustrated in the visual feedback system 501. It will be understood that aspects of the disclosure provide for the use of any of the interface units 30, 130, 230 in the visual feedback system 501. Further, the interface unit 230 or other portions of the visual feedback system 501 can be utilized with an interactive console or gaming console similar to that described in FIG. 1.

A set of visual feedback devices 540 is provided in the visual feedback system 501 and electrically coupled to the interface unit 230 via the link 17. A casing 549 similar to the casing 349 can be provided in the set of visual feedback devices 540. One difference is that the casing 549 further includes a freestanding frame 589. The freestanding frame 589 is configured to rest on a surface adjacent the display assembly 520. In the illustrated example, two vertical freestanding frames 589 are provided on left and right sides of the display assembly 520. The line 18 couples the freestanding frames 589 for signal connection, power connection, or the like.

Another difference is that the visual feedback system 501 includes multiple zones corresponding to a directional property of a received audio signal, such as from the interactive console 10 (FIG. 1). A first zone 526, a second zone 527, and a third zone 528 are illustrated on one of the freestanding frames 589. It will be understood that any number of zones can be provided.

In one non-limiting example of operation, the first zone 526 can be illuminated based on sound signals emanating from a first direction (e.g. front-right), the second zone 527 can be illuminated based on sound signals emanating from a second direction (e.g. right), and the third zone 528 can be illuminated based on sounds signals emanating from a third direction (e.g. rear-right).

Figure 24:
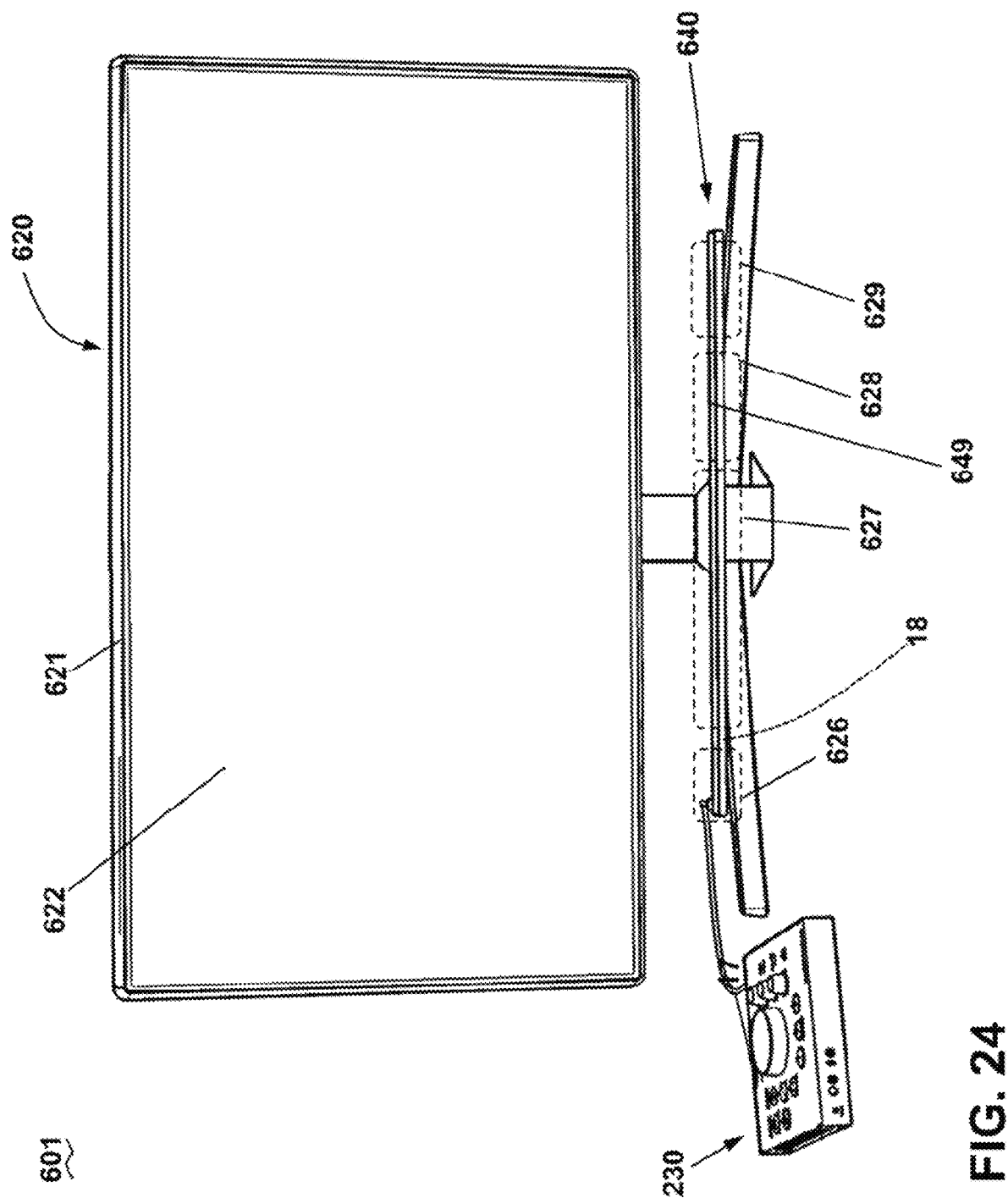
FIG. 24 is a schematic front view of another exemplary visual feedback system including an interface unit, a display assembly, and a set of visual feedback devices in accordance with various aspects described herein.

Turning to FIG. 24, another exemplary visual feedback system 601 is shown. The visual feedback system 501 is similar to the visual feedback systems 1, 101, 201, 301, 401, 501; therefore, like parts will be described with like numerals further increased by 100, with it being understood that the description of the like parts of the visual feedback system 1, 101, 201, 301, 401, 501 applies to the visual feedback system 601, except where noted.

The visual feedback system 601 includes a display assembly 620 with a housing 621 and a display panel 622. The interface unit 230 is illustrated in the visual feedback system 601. It will be understood that aspects of the disclosure provide for the use of any of the interface units 30, 130, 230 in the visual feedback system 601. Further, the interface unit 230 or other portions of the visual feedback system 601 can be utilized with an interactive console or gaming console similar to that described in FIG. 1.

A set of visual feedback devices 640 is provided in the visual feedback system 601 and electrically coupled to the interface unit 230 via the link 17. A casing 649 similar to the casing 349 can be provided in the set of visual feedback devices 640. One difference is that the casing 649 is configured to rest horizontally on a surface adjacent and below the display assembly 520, such as in front of a user's keyboard (not shown). In the illustrated example, a single casing 649 is provided. Multiple zones can be defined within the set of visual feedback devices 640 corresponding to a directional property of a received audio signal, such as from the interactive console 10 (FIG. 1).

In the illustrated example, a first zone 626, a second zone 627, a third zone 628, and a fourth zone 629 are provided within the casing 649. One difference is that the zones 626, 627, 628, 629 do not have equal sizes. Any number of zones can be utilized, and the zones can include any number of light sources.

In one non-limiting example of operation, the first zone 626 can be illuminated based on sound signals emanating from a first direction (e.g. left), the second zone 527 can be illuminated based on sound signals emanating from a second direction (e.g. rear center), the third zone 528 can be illuminated based on sounds signals emanating from a third direction (e.g. right), and the fourth zone 629 can be illuminated based on another property of a received sound signal including, but not limited to, slowly changing color to represent a soft sound e.g. footsteps, blinking rapidly or strobe-like to represent a sudden loud sound e.g. a door slamming, changing color to represent a sound e.g. changing to blue for a rushing water sound.

Aspects of the disclosure provide for a variety of benefits. The use of visual feedback indicating auditory events in a virtual environment, such as that found in a gaming system or console, can improve accessibility of the virtual environment for users who may have a hearing impairment or desire to use the virtual environment with the sound turned off. The light sources described herein can provide for visual representation of a sound signal through visual behavior of the light sources, including indication of a type of sound (e.g. footsteps, ambient noise, wind blowing, talking, door slamming, or the like), a quality of sound (e.g. constant, sharp, general noise, or the like), a loudness of sound, or a direction of sound (e.g. in front of the user's avatar, to the left of the avatar, or a combination thereof). In an example where the visual feedback system is mounted to the display panel, such a system can be utilized as an aftermarket accessory and utilized with a variety of known displays without need of purchasing an additional display. In another example where the visual feedback system is integrated with the display panel, e.g. integrated with the housing, such integration can provide for a streamlined look for the user and simplified setup, e.g. with the majority or all of the wiring connections between the interface and display already made during manufacture. This can provide an improved "plug and play" experience for the user.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims.

What is claimed is:

1. A visual feedback system, comprising:
an interface unit comprising:
at least one input configured to receive an audio signal;
a processor configured to receive the audio signal and to generate an output signal indicative of at least one property of the audio signal; and
at least one user-operable controller configured to selectively control a sensitivity level of the processor with respect to the audio signal for generating the output signal; and
at least one visual feedback device electrically coupled to the interface unit and having a set of light sources configured to illuminate based on the at least one property of the output signal.

2. The visual feedback system of claim 1, further comprising a display assembly having a display panel and a housing surrounding the display panel.

3. The visual feedback system of claim 2, wherein the at least one visual feedback device is one of integrated into or coupled to the display assembly.

4. The visual feedback system of claim 1, wherein the at least one property comprises at least one of a type of sound, a quality of sound, or a loudness of sound, and wherein the set of light sources are configured to display at least one visual behavior indicative of the at least one of the type of sound, the quality of sound, or the loudness of sound.

5. The visual feedback system of claim 4, wherein the at least one visual behavior comprises at least one of illuminating with constant brightness, increasing brightness, decreasing brightness, blinking, pulsing, changing color, or progressively illuminating a sequence of adjacent light sources.

6. The visual feedback system of claim 1, wherein the at least one visual feedback device comprises multiple visual feedback devices.

7. The visual feedback system of claim 6, wherein the set of light sources of each of the multiple visual feedback devices are user facing.

8. The visual feedback system of claim 6, wherein the set of light sources of each of the multiple visual feedback devices are not user facing.

9. The visual feedback system of claim 1, wherein the at least one user-operable controller comprises a front controller, a rear controller, a side controller, and a center controller each adjusting a sensitivity of the corresponding processor to the audio signal.

10. The visual feedback system of claim 1, wherein the set of light sources comprises a set of light-emitting diodes.

11. The visual feedback system of claim 10, further comprising a brightness controller adjusting a brightness of the set of light-emitting diodes.

12. A visual feedback system, comprising:
an interface unit comprising:
at least one input configured to receive an audio signal;

a processor configured to receive the audio signal and to generate an output signal indicative of at least one property of the audio signal; and at least one user-operable controller configured to selectively control a sensitivity level of the processor with respect to the audio signal for generating the output signal; and at least one visual feedback device electrically coupled to the interface unit and having a set of light sources configured to illuminate based on the at least one property of the output signal;

wherein the at least one property comprises at least one of a directional property, a type of sound, a quality of sound, or a loudness of sound.

13. The visual feedback system of claim 12, wherein the at least one property is a directional property.

14. The visual feedback system of claim 13, wherein the at least one property comprises a first sound intensity emanating from a first direction and a second sound intensity emanating from a second direction, and wherein the set of light sources comprises a first light source configured to illuminate based on the first sound intensity and a second light source configured to illuminate based on the second sound intensity.

15. The visual feedback system of claim 12, wherein the set of light sources is configured to display at least one visual behavior indicative of the at least one of the type of sound, the quality of sound, or the loudness of sound.

16. The visual feedback system of claim 15, wherein the at least one visual behavior comprises at least one of illuminating with constant brightness, increasing brightness, decreasing brightness, blinking, pulsing, changing color, or progressively illuminating a sequence of adjacent light sources.

17. The visual feedback system of claim 12, wherein the at least one visual feedback device comprises multiple visual feedback devices.

18. The visual feedback system of claim 17, wherein the set of light sources of each of the multiple visual feedback devices are user facing.

19. The visual feedback system of claim 12, wherein the set of light sources comprises at least one light-emitting diode.

20. The visual feedback system of claim 12, wherein the at least one user-operable controller comprises a front controller, a rear controller, a side controller, and a center controller each adjusting a sensitivity of the corresponding processor to the audio signal.

* * * * *